United States Patent
Alarcon-Cot et al.

(10) Patent No.: US 9,948,177 B2
(45) Date of Patent: Apr. 17, 2018

(54) POWER CONVERSION DEVICE

(71) Applicant: PHILIPS LIGHTING HOLDING B.V., Eindhoven (NL)

(72) Inventors: Eduardo-Jose Alarcon-Cot, Eindhoven (NL); Julia Delos Ayllon, Eindhoven (NL); Toni Lopez, Eindhoven (NL); Reinhold Elferich, Eindhoven (NL); Harald Josef Gunther Radermacher, Eindhoven (NL); Machiel Antonius Martinus Hendrix, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/541,633

(22) PCT Filed: Jan. 7, 2015

(86) PCT No.: PCT/EP2015/081298
§ 371 (c)(1),
(2) Date: Jul. 5, 2017

(87) PCT Pub. No.: WO2016/110429
PCT Pub. Date: Jul. 14, 2016

(65) Prior Publication Data
US 2017/0338735 A1    Nov. 23, 2017

(30) Foreign Application Priority Data
Jan. 7, 2015   (EP) ..................................... 15150324

(51) Int. Cl.
*H02M 3/28*    (2006.01)
*H02M 1/42*    (2007.01)
(Continued)

(52) U.S. Cl.
CPC ......... *H02M 1/4233* (2013.01); *H02M 1/088* (2013.01); *H02M 3/07* (2013.01);
(Continued)

(58) Field of Classification Search
CPC .......... H02M 1/42; H02M 7/219; H02M 3/07; H02M 1/088; H02M 1/4233; H05B 33/08
(Continued)

(56) References Cited

U.S. PATENT DOCUMENTS 8,693,224 B1    4/2014   Giuliano
9,743,469 B2 *  8/2017   Delos Ayllon ..... H05B 33/0815
(Continued)

OTHER PUBLICATIONS

Chengrui Le et al, "A Stackable Switched-Capacitor DC/DC Converter IC for LED Drivers with 90% Efficiency", IEEE, 2012.
(Continued)

*Primary Examiner* — Douglas W Owens
*Assistant Examiner* — Wei Chan

(57) ABSTRACT

A system for supplying a load comprising: an input inductor configured to receive an input voltage, a selection module connected to the inductor via a switching node, and a multi-level half-bridge stage comprising a plurality of half-bridge stages, each half-bridge stage comprising a pair of switches connected between a switching node; a power combining stage coupled to each half-bridge stage using parallel bus voltage lines output from the multi-level half-bridge stage, the power combining stage configured to output a voltage to the load; and a controller configured, based on the input voltage, to selectively control a half-bridge stage to operate in a half-bridge mode to provide a stepped-up voltage on a bus voltage line, wherein the controller is further configured to control the power com-
(Continued)

bining stage to provide a voltage between the bus voltage lines and the sum of these voltages is higher than a peak of the input voltage.

15 Claims, 16 Drawing Sheets

(51) Int. Cl.
*H02M 3/07* (2006.01)
*H02M 1/088* (2006.01)
*H02M 7/219* (2006.01)
*H05B 33/08* (2006.01)
*H05B 37/02* (2006.01)

(52) U.S. Cl.
CPC ........ *H02M 7/219* (2013.01); *H05B 33/0815* (2013.01); *H05B 37/02* (2013.01)

(58) Field of Classification Search
USPC .................. 363/17, 98, 26, 132, 15, 65, 97; 323/265, 282, 284
See application file for complete search history.

(56) References Cited

U.S. PATENT DOCUMENTS

| | | | |
|---|---|---|---|
| 2008/0239772 A1* | 10/2008 | Oraw | H02M 3/07 363/60 |
| 2009/0322384 A1 | 12/2009 | Bradley et al. | |
| 2017/0099013 A1* | 4/2017 | Martini | H02M 7/487 |

OTHER PUBLICATIONS

Mitchell Kline et al, "A Transformerless Galvanically Isolated Switched Capacitor LED Driver",IEEE, 2012, pp. 2357-2360.

Uno Masatoshi et al, "Multi-port Converter Integrating Boost and Switched Capacitor Converters for Single-Cell Battery Power System in Small Satellite", 2013 IEEE ECCE Asia Downunder, IEEE, Jun. 3, 2013, pp. 747-752, XP032475409.

* cited by examiner

POWER CONVERSION DEVICE

CROSS-REFERENCE TO PRIOR APPLICATIONS

This application is the U.S. National Phase application under 35 U.S.C. § 371 of International Application No. PCT/EP2015/081298, filed on Dec. 28, 2015 which claims the benefit of European Patent Application No. 15150324.0, filed on Jan. 7, 2015. These applications are hereby incorporated by reference herein.

TECHNICAL FIELD

The current invention relates to the field of integrated power converters. The current invention can notably apply to drive circuits for Light Emitting Diode (LED) light sources. More specifically, the current invention relates to a compact and efficient power conversion device.

BACKGROUND

Known AC-to-DC converter architectures comprise a first boost power factor correction (PFC) converter stage receiving an alternating current (AC) rectified voltage and a second DC-to-DC voltage converter stage, whereby the two stages are interconnected through a direct current (DC) link capacitor. Generally the intermediate bus voltage (between the two stages) is fixed to 400V, high enough to guarantee the boost operation for EU mains voltage considering the line variations (365V in the worst case).

Applications requiring a high level of integration of power conversion modules, for example using Switched Mode Power Supplies (SMPS), can resort to power converters such as Switched Capacitor Converters (SCC) for the DC-to-DC voltage converter stage, which can provide highly efficient DC-to-DC voltage conversion with only the use of capacitors and switches, combined with inductive output filters.

Notably, the Solid State Lighting (SSL) Industry's demand for small and compact power management units for LEDs is increasing. LEDs require that a power supply be delivered in the form of a constant current, as efficiently as possible. Ideally, LED drivers comparable in size to the LEDs themselves would represent a significant breakthrough enabling new lighting concepts. Such a solution will require a system with a high level of reliability and efficiency, in order to fit the requirements of life-time, size and heat dissipation.

LED drivers can be based on SMPS. SMPS can comprise SCCs, which allow a high level of integration and achieve large power conversion ratios, but have the drawback of providing plural discrete conversion ratios, which do not make SCCs suitable for applications where a fine regulation of the output power is required.

SMPS can also comprise conventional Inductive Converters, comprising a plurality of inductors and switches. Inductive Converters allow a fine regulation of the output power and can efficiently provide an arbitrary conversion ratio, but one drawback of Inductive Converters is that they cannot be easily integrated in compact structures.

Hybrid Switched Capacitor Converters (H-SCCs) use the pulsed width modulated voltages, available in the internal nodes of SCCs, combined with filter inductors to extend the conversion range and increase the efficiency of the SCCs.

SUMMARY

The inventors have recognised that due to the intermediate bus voltage being at 400V, the switches of the DC-to-DC voltage converter stage have to be rated to handle this voltage. The inventors have identified that the high voltage (HV) switches being used in the state-of-the art offline AC/DC converters, have the following disadvantages: (i) high drain-source, gate-source capacitances of the high voltage solid state switching devices limit frequency of operation, (ii) switching losses are proportional to the square of the blocking voltage, (iii) limited switching frequency restricts the reduction of filter elements, (iv) limited availability of low cost HV switches for Very Large Scale Integration (VLSI), curbing power integration on chip and/or cost-effective integration.

According to one aspect of the present disclosure there is provided a power conversion system for supplying a load, the power conversion system comprising: a power factor corrective front end comprising: an input inductor configured to receive a rectified mains input voltage, a selection module connected to the input inductor via a switching node, and a multi-level half-bridge stage comprising a plurality of half-bridge stages, each half-bridge stage comprising a pair of switches connected between a switching node, whereby each half-bridge switching node is connected to one of a plurality of outputs of the selection module; a power combining stage coupled to each half-bridge stage of the power factor corrective front end by way of one of a plurality of parallel bus voltage lines output from said multi-level half-bridge stage, the power combining stage configured to combine power on the plurality of parallel bus voltage lines to output a DC voltage to said load; and a controller configured, in dependence on the rectified mains input voltage, to selectively control one of said half-bridge stages to operate in a half-bridge mode, and control the selection module to connect the switching node with the switching node of the selected half-bridge stage to provide a stepped-up voltage on one of the plurality of parallel bus voltage lines, wherein the controller is further configured to control the power combining stage to provide a voltage between each of the plurality of parallel bus voltage lines, wherein the sum of the voltages across each of the plurality of parallel bus voltage lines is higher than a peak of the rectified mains input voltage.

The selection module may comprise a plurality of switches and a plurality of voltage clamping components, each voltage clamping component configured to operate as a voltage clamp to limit a maximum blocking voltage of one of the switches to said voltage.

The controller may comprise an inductor current sensing circuit configured to sense current in the input inductor; and may be configured to generate pulse width modulated signals for driving an upper switch of the half-bridge stage and lower switch of the half-bridge stage operating in the half-bridge mode, based on the sensed current in the input inductor.

The controller may further comprise a current controller stage comprising a first comparator configured to compare the sensed current in the input inductor to an upper threshold and a second comparator configured to compare the sensed current in the input inductor to a lower threshold, wherein outputs of the first comparator and the second comparator are used to generate the pulse width modulated signals for driving an upper switch of the half-bridge stage and lower switch of the half-bridge stage operating in the half-bridge mode.

The current controller stage may comprise an S-R latch, wherein the output of the first comparator is supplied to a first input of the S-R latch and the output of the second comparator is supplied to a second input of the S-R latch, and a first output of the S-R latch outputs a pulse width modulated signal for driving the upper switch of the half-bridge stage and a second output of the S-R latch outputs a pulse width modulated signal for driving the lower switch of the half-bridge stage.

The controller may further comprise: a comparator stage configured to compare said voltage to a voltage set point to output an error signal; and a power factor controller stage configured to receive the error signal as an input, and adjust the upper threshold based on the error signal.

In an exemplary embodiment, wherein the error signal indicates said voltage is less than the voltage set point, the power factor controller stage is configured increase the upper threshold; and wherein the error signal indicates said voltage is greater than the voltage set point, the power factor controller stage is configured decrease the upper threshold.

The controller may control the half-bridge stage to operate in the half-bridge mode in accordance with a critical conduction mode. In this embodiment, the lower threshold may be set to zero.

The power combining stage may comprise a Switched Capacitor Converter, comprising a plurality of switches controlled by the controller.

The Switched Capacitor Converter may be based on a Dickson ladder topology comprising a first set of switches and a second set of switches, wherein the controller is configured to drive the first set of switches and the seconds set of switches in a complementary manner.

The Switched Capacitor Converter may comprise a grounded capacitor ladder comprising a plurality of capacitors, and a flying capacitor ladder comprising at least one capacitor.

The controller may be configured to drive the first set of switches and the seconds set of switches to control the capacitors in the flying capacitor ladder to switch between terminals of the grounded capacitor ladder to provide said voltage between each of the plurality of parallel bus voltage lines.

The Switched Capacitor Converter may have a fixed step-down conversion ratio.

According to another aspect of the present disclosure there is provided a light module comprising at least one light source and a power conversion system according to any embodiment described herein for supplying a DC voltage to the at least one light source.

The at least one light source may comprise one or more light emitting diode.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Figure 1:
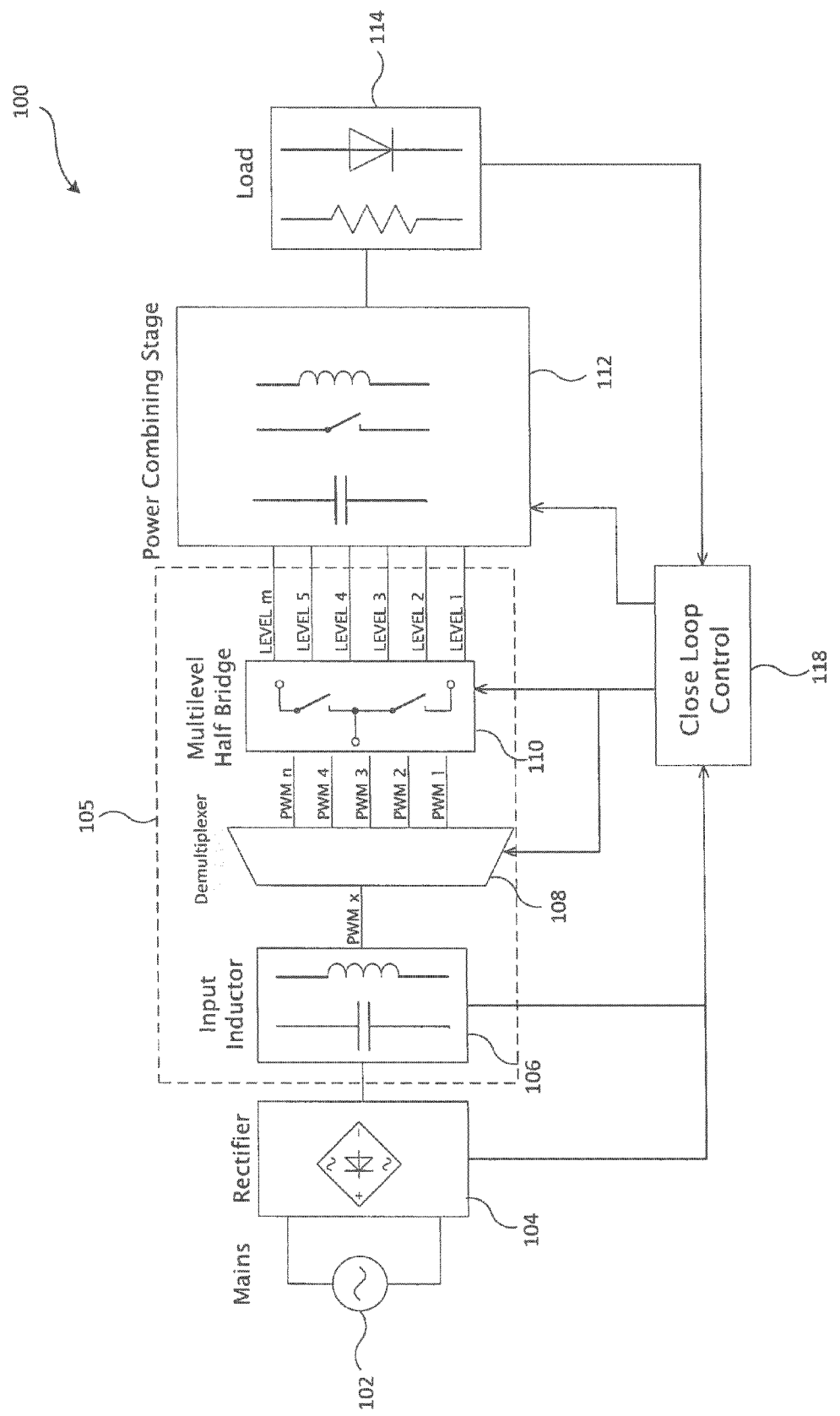
FIG. 1 illustrates a schematic block diagram of a power conversion system.

Reference is first made to FIG. 1 which illustrates a power conversion system 100 comprising a mains supply voltage source 102, a rectifier 104 for rectifying a mains supply voltage supplied by the mains supply voltage source 102, a segmented PFC boost converter stage 105, a power combining stage 112, a load 114 and a controller 118.

As will be appreciated by persons skilled in the art, the mains supply voltage supplied by the mains supply voltage source 102 is an AC voltage having a value in dependence of the geographical location of the mains supply voltage source 102. For example, the mains supply voltage may be in the range of 90-130 Vrms, corresponding to the grid voltage in the USA, or in the range of 200-260 Vrms, corresponding to the grid voltage in European countries.

The rectifier 104 is arranged to convert the AC mains supply voltage supplied by the mains supply voltage source 102 to a DC voltage (i.e. a rectified mains voltage). The rectifier 104 may for example comprise a diode bridge. Persons skilled in the art are familiar with how such a rectifier performs AC voltage rectification, therefore further detail on the rectifier 104 is not included herein.

The rectifier 104 is arranged to supply the rectified mains voltage to the segmented PFC boost converter stage 105.

PFC converters are utilized to improve the power factor of AC power. An important consideration in the design of power converters is that a power converter should provide a high power factor. The power factor of power converters generally refers to the ratio of the true power to the product of the voltage and current in the circuit. A high power factor is one which approximates or exceeds 0.9, with the maximum power factor being 1.0. For example, in an electric powered device, a load with a low power factor has a higher current flow than a load with a high power factor for the same amount of useful power transferred.

The segmented PFC boost converter stage 105 comprises an input inductor ($L_{in}$) 106, a demultiplexer 108 and a multi-level half-bridge stage 110. The segmented PFC boost converter stage 105 is configured to change the waveform of current drawn by the load to improve the power factor.

The multi-level half-bridge stage 110 of the segmented PFC boost converter stage 105 is coupled to the power combining stage 112.

In embodiments described below, the power combining stage 112 comprises a switched capacitor converter (SCC) that is configured to operate as n:1 voltage divider (where n>=2).

The controller 118 allows a control loop by controlling the demultiplexer 108, the multi-level half-bridge stage 110, and the SCC stage 112 as a function of input signals representative of a sensed rectified mains voltage supplied by the rectifier 104, the rectified mains voltage output by the input inductor 106, and/or a signal representative of a sensed load voltage, sensed bus voltage $V_{BUS}$, load current or load power.

Figure 2:
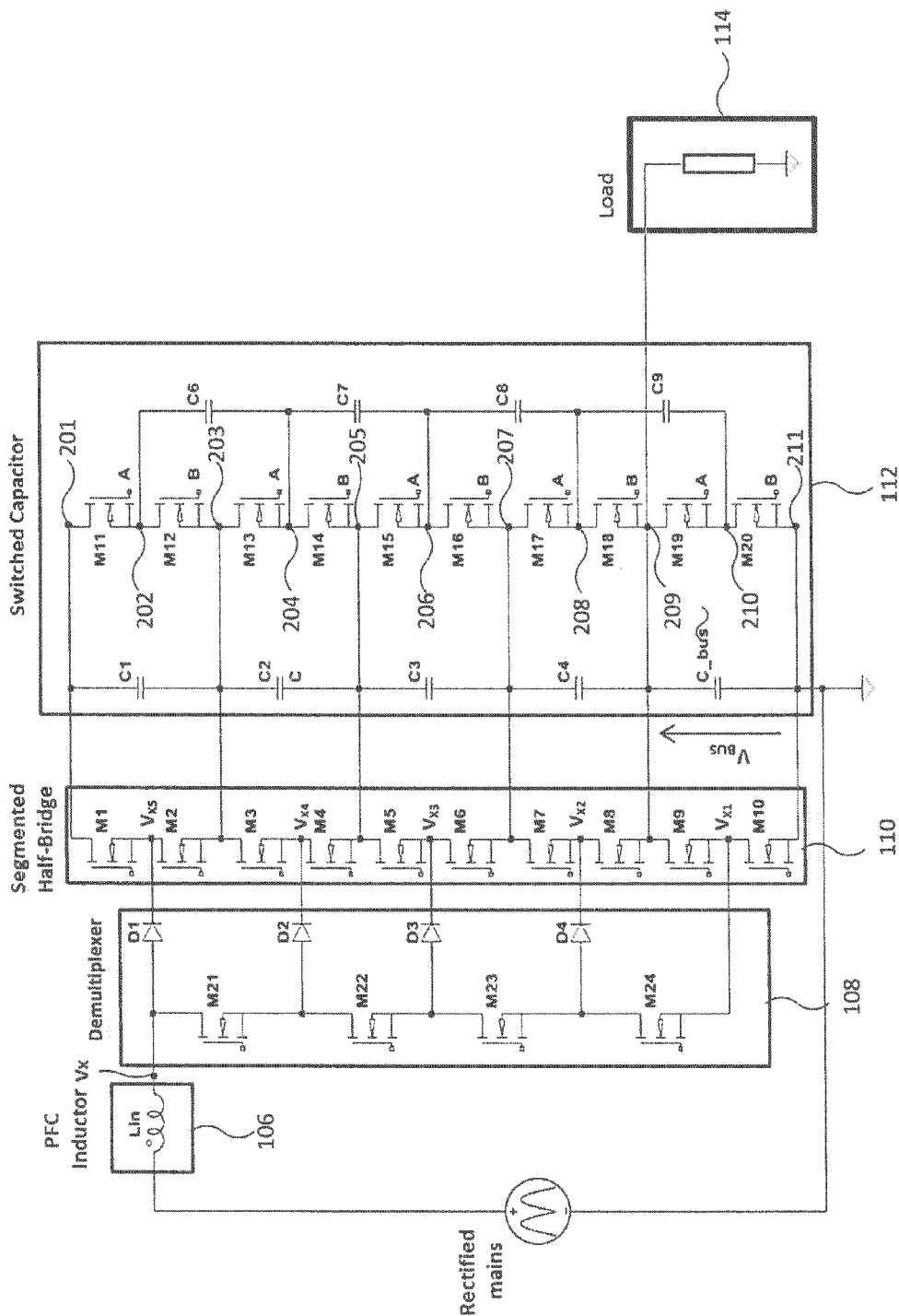
FIG. 2 shows a schematic block diagram of the power conversion system according to an exemplary embodiment of the present invention.

Reference is now made to FIG. 2 which shows an electrical diagram illustrating the segmented PFC boost converter stage 105 and the SCC stage 112 in more detail in an exemplary embodiment of the invention. In the illustrated exemplary embodiment the SCC stage 112 operates as a 5:1 voltage divider i.e. a divide-by-five voltage divider.

The SCC stage 112 uses a Dickson Ladder topology based on nine capacitors $C_{BUS}$-C9 and ten switches M11-M20 of the single pole, single throw type. More specifically, the SCC stage 112 comprises two capacitor ladders, a grounded capacitor ladder and a flying capacitor ladder. The number of capacitors in the grounded capacitor ladder scales with the number of stages used, for an n:1 voltage divider (where n≥2), there is n capacitors in the grounded capacitor ladder. The number of capacitors in the flying capacitor ladder also scales with the number of stages used, for an n:1 voltage divider (where n≥2), there is n-1 capacitors in the flying capacitor ladder.

As shown in FIG. 2, the SCC stage 112 operating as a 5:1 voltage divider has a grounded capacitor ladder comprising capacitors $C_1$, $C_2$, $C_3$, $C_4$ and $C_{BUS}$ (mains storage capacitor) and a flying capacitor ladder comprising capacitors $C_6$, $C_7$, $C_8$ and $C_9$.

The SCC stage 112 further comprises eleven central nodes 201-211. A first switch M11 selectively connects a first central node 201 to the second central node 202. A second switch M12 selectively connects the second central node 202 to the third central node 203. A third switch M13 selectively connects the third central node 203 to the fourth central node 204. A fourth switch M14 selectively connects the fourth central node 204 to the fifth central node 205. A fifth switch M15 selectively connects the fifth central node 205 to the sixth central node 206. A sixth switch M16 selectively connects the sixth central node 206 to the seventh central node 207. A seventh switch M17 selectively connects the seventh central node 207 to the eighth central node 208. An eighth switch M18 selectively connects the eighth central node 208 to the ninth central node 209. A ninth switch M19 selectively connects the ninth central node 209 to the tenth central node 210. A tenth switch M20 selectively connects the tenth central node 210 to the eleventh central node 211. The eleventh central node 211 is connected to ground (e.g. 0 v).

The flying capacitor ladder is located between the second central node 202 and the tenth central node 210. In particular the sixth capacitor $C_6$ is located between the second central node 202 and the fourth central node 204. The seventh capacitor $C_7$ is located between the fourth central node 204 and the sixth central node 206. The eighth capacitor $C_8$ is located between the sixth central node 206 and the eighth central node 208. The ninth capacitor $C_9$ is located between the eighth central node 208 and the tenth central node 210.

The grounded capacitor ladder is located between the first central node 201 and the eleventh central node 211. In particular the first capacitor $C_1$ is located between the first central node 201 and the third central node 203. The second capacitor $C_2$ is located between the third central node 203 and the fifth central node 205. The third capacitor $C_3$ is located between the fifth central node 205 and the seventh central node 207. The fourth capacitor $C_4$ is located between the seventh central node 207 and the ninth central node 209. The mains storage capacitor $C_{BUS}$ is located between the ninth central node 209 and the eleventh central node 211.

The controller 118 (shown in FIG. 2) is configured to drive the switches M11-M20 of the SCC stage 112 in a complementary fashion. That is, the controller 118 controls switches M11, M13, M15, M17, and M19 to be in a given state during a first time phase A, for instance turned on, whilst the second PWM signal is used to control switches M12, M14, M16, M18, and M20 to be in the opposite state, for instance turned off During a successive second time phase B, the states of all the switches can be reversed.

The multi-level half-bridge stage 110 comprises n half-bridge stages. As shown in FIG. 2, as the SCC stage 112 operates as a n:1 voltage divider (n=5), the multi-level half-bridge stage 110 comprises five half-bridge stages. Each half-bridge stage comprises two switches (an upper switch and a lower switch).

A first half-bridge stage comprising an upper switch M1 and a lower switch M2, is connected in parallel with capacitor $C_1$. The drain connection of switch M1 is connected to the first central node 201 of the SCC stage 112. The source connection of switch M1 is connected to the drain connection of switch M2. The source connection of switch M2 is connected to the third central node 203 of the SCC stage 112. A fifth switching node $V_{x5}$ is located between the source connection of switch M1 and the drain connection of switch M2.

A second half-bridge stage comprising an upper switch M3 and a lower switch M4, is connected in parallel with capacitor $C_2$. The drain connection of switch M3 is connected to the third central node 203 of the SCC stage 112. The source connection of switch M3 is connected to the drain connection of switch M4. The source connection of switch M4 is connected to the fifth central node 205 of the SCC stage 112. A fourth switching node $V_{x4}$ is located between the source connection of switch M3 and the drain connection of switch M4.

A third half-bridge stage comprising an upper switch M5 and a lower switch M6, is connected in parallel with capacitor $C_3$. The drain connection of switch M5 is connected to the fifth central node 205 of the SCC stage 112. The source connection of switch M5 is connected to the drain connection of switch M6. The source connection of switch M6 is connected to the seventh central node 207 of the SCC stage 112. A third switching node $V_{x3}$ is located between the source connection of switch M5 and the drain connection of switch M6.

A fourth half-bridge stage comprising an upper switch M7 and a lower switch M8, is connected in parallel with capacitor $C_4$. The drain connection of switch M7 is connected to the seventh central node 207 of the SCC stage 112. The source connection of switch M7 is connected to the drain connection of switch M8. The source connection of switch M8 is connected to the ninth central node 209 of the SCC stage 112. A second switching node $V_{x2}$ is located between the source connection of switch M7 and the drain connection of switch M8.

A fifth half-bridge stage comprising an upper switch M9 and a lower switch M10, is connected in parallel with mains storage capacitor $C_{BUS}$. The drain connection of switch M9 is connected to the ninth central node 209 of the SCC stage 112. The source connection of switch M9 is connected to the drain connection of switch M10. The source connection of switch M10 is connected to the eleventh central node 211 of the SCC stage 112. A second switching node $V_{x1}$ is located between the source connection of switch M9 and the drain connection of switch M10.

At any one time, the controller 118 controls the switches of only one of the half-bridge stages to operate in half-bridge mode, as described in further detail below. When a half-bridge stage operates in half-bridge mode, the lower switch and upper switch of the half-bridge stage are turned on and off complementary to each other.

As shown in FIG. 2, the input inductor 106 is arranged to be connected between the rectified mains voltage output from the rectifier 104 and the switching node $V_x$. The switching node $V_x$ is connected to the input of the demultiplexer 108. The demultiplexer 108 is configured to route the switching node $V_x$ with one of the different floating switching nodes ($V_{x1}$, $V_{x2}$, $V_{x3}$, $V_{x4}$, and $V_{x5}$) in the multi-level half-bridge stage 110, allowing the input inductor 106 be excited at the different PWM voltages PWM1, PWM2, . . . PWMn generated by the different floating half-bridge stages 110. The demultiplexer 108 can thus be considered as a 1:n demultiplexer.

As shown in FIG. 2, the demultiplexer 108 comprises a plurality of switches M21-M24 and a plurality of diodes D1-D4.

A positive terminal (anode) of a first diode D1 is connected to the switching node $V_x$, and the negative terminal (cathode) of the first diode D1 is connected to the switching node $V_{x5}$. A drain connection of switch M21 is connected to the switching node $V_x$. A positive terminal (anode) of a second diode D2 is connected to the source connection of switch M21 and the negative terminal (cathode) of the second diode D2 is connected to the switching node $V_{x4}$. A drain connection of switch M22 is connected to the source connection of switch M21. A positive terminal (anode) of a third diode D3 is connected to the source connection of switch M22 and the negative terminal (cathode) of the third diode D3 is connected to the switching node $V_{x3}$. A drain connection of switch M23 is connected to the source connection of switch M22. A positive terminal (anode) of a fourth diode D4 is connected to the source connection of switch M23 and the negative terminal (cathode) of the fourth diode D4 is connected to the switching node $V_{x2}$. A drain connection of switch M24 is connected to the source connection of switch M23. A source connection of switch M24 is connected to the switching node $V_{x1}$.

As described above, in a state-of-the-art boost PFC converter, the intermediate bus voltage is typically fixed above 400V therefore high voltage (HV) switches in the SCC stage 112 must be used.

In accordance with embodiments of the present invention, using the segmented PFC boost converter stage 105, the intermediate bus voltage e.g. 400V value keeps the same; however the voltage stress seen by all the devices, switches and capacitors in the SCC stage 112, is determined by the number of levels used. In the illustrative embodiment shown in FIG. 2 the intermediate bus voltage is divided in 5 levels, the voltage across each level is referred to herein as $V_{BUS}$ which is approximately equal to 80V. Thus, the mains storage capacitor $C_{BUS}$ operates with a much lower voltage, which facilitates the replacement of the typical electrolytic capacitor by a more reliable technology available in lower voltage ranges. The SCC stage 112 steps down the intermediate bus voltage to output the voltage $V_{BUS}$ at it's output.

The capacitors in the flying ladder switch between the terminals of the grounded ladder capacitors, e.g. during phase A $C_6$ is in parallel with $C_1$, and during phase B $C_6$ is in parallel with $C_2$. In this way the voltage in the capacitors is equalized and the charge is transported from the input terminal to the output, therefore the voltage between the terminals of all the capacitors is the same and equal to $V_{BUS}$.

The demultiplexer 108 is designed to use diodes $D_1$ to $D_4$ and the grounded leg capacitors as voltage clamps for the multiplexer switches M21-M24 limiting their maximum blocking voltage to $V_{BUS}$ (described in more detail below with reference to FIG. 3a). The diodes $D_1$ to $D_4$ of the demultiplexer 108 are the only devices that have to block the full voltage of the mains input (described in more detail below with reference to FIG. 3b). The rest of the switches are only blocking the bus voltage ($V_{BUS}$). Unlike a classical two stage converter, where the stages are interconnected through a dc link capacitor, the presented architecture uses the capacitors of the grounded ladder of the SCC stage 112 to link the two stages, whereby the totality of the intermediate bus voltage is equally divided among the grounded ladder capacitors. Whilst voltage clamping components have been described above with reference to diodes $D_1$ to $D_4$, it will be appreciated that other components such as high voltage rated switches may replace the diodes and still provide the same voltage clamping functionality.

Depending on the input voltage the demultiplexer 108 connects the switching node $V_x$ to the corresponding switching node provided by the half-bridges, as described in more detail below with reference to FIGS. 3a and 3b.

Figures 3A, 3B:
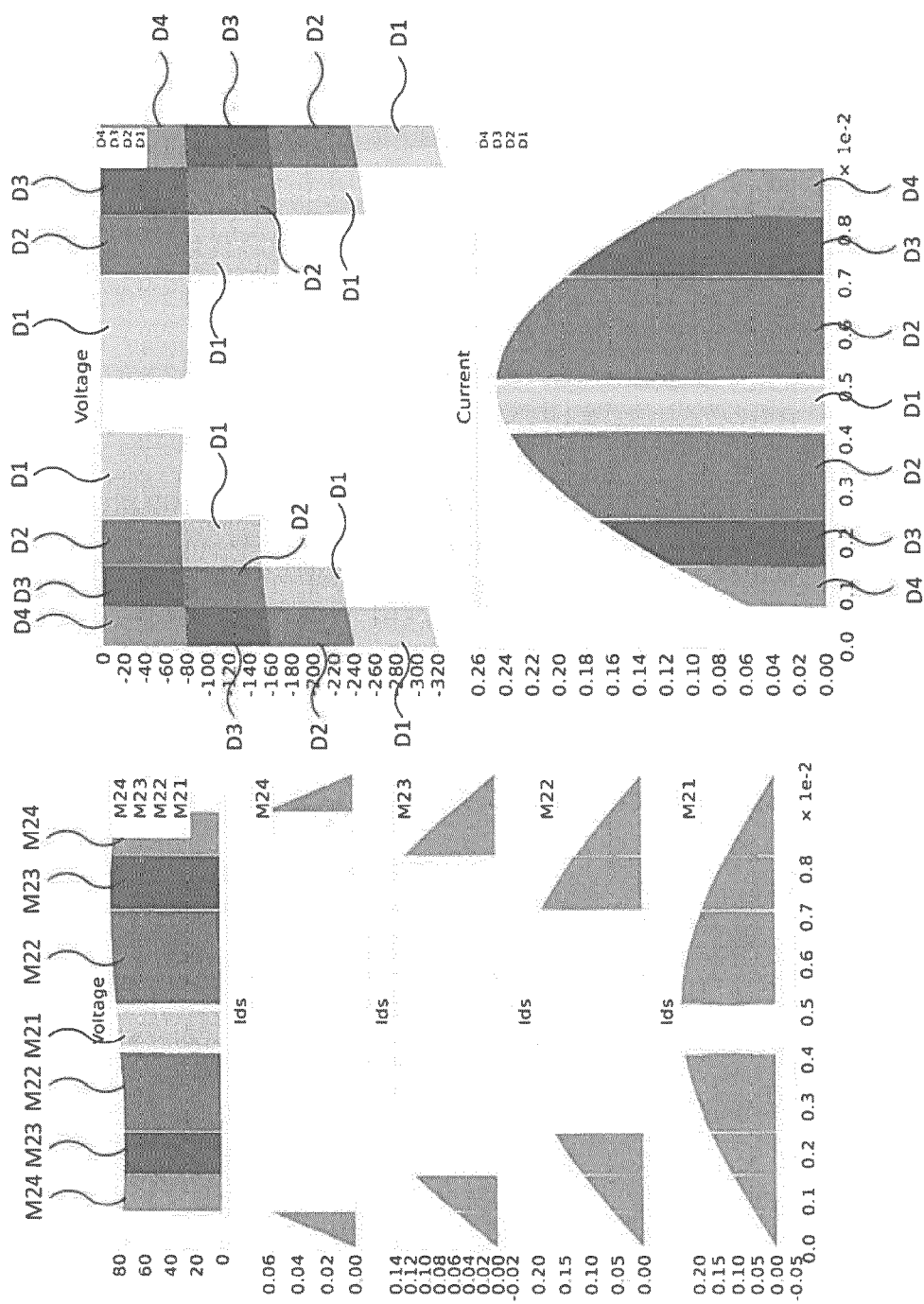
FIG. 3a illustrates the current and voltage stress in switches of a demultiplexer stage of the power conversion system.
FIG. 3b illustrates the current and voltage stress in diodes of a demultiplexer stage of the power conversion system.

FIG. 3a illustrates the current and voltage stress in the switches M21-M24 of the demultiplexer 108. FIG. 3b illustrates the current and voltage stress in the diodes D1-D4 of the demultiplexer 108.

When the rectified mains voltage output from the rectifier 104, referred to as $V_{in}$ herein after, is in the range, $0 \leq V_{in} < V_{BUS}$ all of the switches M21-M24 are turned on (as shown in FIG. 3a) such that no current flows in any of the diodes D1-D4. The maximum blocking voltage across the first diode D1 is $-4*V_{BUS}$ (around −320V), the maximum blocking voltage across the second diode D2 is $-3*V_{BUS}$ (around −240V), the maximum blocking voltage across the third diode D3 is $-2*V_{BUS}$ (around −160V), and the maximum blocking voltage across the fourth diode D4 is $-V_{BUS}$ (around −80V). This is shown in FIG. 3b. In this scenario, switches M9 and M10 of the multi-level half-bridge stage 110 are the switches that compose the half-bridge. These two switches enable the generation of a PWM voltage at the switching node V. The PWM voltage at the switching node $V_x$ is at 0V when the lower half-bridge switch M10 is turned on (and the upper half-bridge switch M9 is turned off) and is at $V_{BUS}$ when M9 is turned on (M10 turned off). This PWM action enables to boost the input voltage from $0 \leq V_{in} < V_{BUS}$ to $V_{BUS}$ which is output on a segmented bus voltage output line $V_{L1}$, in accordance with conventional boost converter operation. The segmented bus voltage output line $V_{L1}$ is connected between the drain connection of switch M9 and the ninth central node 209. Thus it can be seen that the voltage $V_{BUS}$ will be across the mains storage capacitor $C_{BUS}$.

During phase A, flying capacitor $C_9$ is in parallel with the grounded capacitor $C_4$, and during phase B flying capacitor $C_9$ is in parallel with the mains storage capacitor $C_{BUS}$. This switching results in the voltage $V_{BUS}$ being across the grounded capacitor $C_4$. Thus a voltage of $2*V_{BUS}$ will be present on a segmented bus voltage output line $V_{L2}$. The segmented bus voltage output line $V_{L2}$ is connected between the drain connection of switch M7 and the seventh central node 207. It will be appreciated that this switching of capacitors in the flying ladder being connected between the terminals of grounded ladder capacitors occurs for all of the capacitors in the flying ladder.

Thus the voltage $V_{BUS}$ will be across the grounded capacitor $C_3$, resulting in a voltage of $3*V_{BUS}$ being present on a segmented bus voltage output line $V_{L3}$ (the segmented bus voltage output line $V_{L3}$ is connected between the drain connection of switch M5 and the fifth central node 205). Similarly, the voltage $V_{BUS}$ will be across the grounded capacitor $C_2$, resulting in a voltage of $4*V_{BUS}$ being present on a segmented bus voltage output line $V_{L4}$ (the segmented bus voltage output line $V_{L4}$ is connected between the drain connection of switch M3 and the third central node 203). Furthermore, the voltage $V_{BUS}$ will be across the grounded capacitor $C_1$, resulting in a voltage of $5*V_{BUS}$ being present on a segmented bus voltage output line $V_{L5}$ (the segmented bus voltage output line $V_{L5}$ is connected between the drain connection of switch M1 and the first central node 201).

When $V_{in}$ is in the range, $V_{BUS} \leq V_{in} < 2*V_{BUS}$—the switches M21-M23 are turned on such that no current flows in any of the diodes D1-D3, and the switch M24 is turned off (as shown in FIG. 3a) such that current flows in the fourth diode D4. The maximum blocking voltage across the first diode D1 is $-3*V_{BUS}$ (around −240V), the maximum blocking voltage across the second diode D2 is $-2*V_{BUS}$ (around −160V), the maximum blocking voltage across the third diode D3 is $-V_{BUS}$ (around −80V). This is shown in FIG. 3b. The voltage across the fourth diode D4 is the typical forward voltage of a conducting diode e.g. 0.75V. In this scenario, switches M7 and M8 of the multi-level half-bridge stage 110 are the switches that compose the half-bridge. These two switches enable the generation of a PWM voltage at the switching node V. The PWM voltage at the switching node $V_x$ is at $V_{BUS}$ when the lower half-bridge switch M8 is turned on (and the upper half-bridge switch M7 is turned off) and is at $2*V_{BUS}$ when M7 is turned on (M8 turned off). This PWM action enables to boost the input voltage from $80 < V_{in} < 160$ to $2*V_{BUS}$ which is output on the segmented bus voltage output line $V_{L2}$, in accordance with conventional boost converter operation. Due to the switching of the capacitors in the flying ladder being connected between the terminals of the grounded ladder capacitors, as described above, the voltage between the terminals of all the grounded ladders capacitors is the same and equal to $V_{BUS}$.

As shown in FIG. 3a, the voltage across switch M24 will never be above $V_{BUS}$ (around 80V in this case). The diodes in the demultiplexer 108 have a clamping function, if in any case the voltage $V_x$ rises above $2*V_{BUS}$ (around 160V) the diode D4 will start conducting and clamp the voltage in $V_x$ at $2*V_{BUS}$. And since the voltage at the source of switch M24 is connected to $V_{BUS}$ through switch M9, the voltage across the switch M24 will be $V_{BUS}$.

When $V_{in}$ is in the range, $2*V_{BUS} \leq V_{in} < 3*V_{BUS}$—the switches M21 and M22 are turned on such that no current flows in the first diode D1 or the second D2, and switches M23 and M24 are turned off (as shown in FIG. 3a) such that current flows in the third diode D3 and the fourth diode D4. The maximum blocking voltage across the first diode D1 is $-2*V_{BUS}$ (around −160V) and the maximum blocking voltage across the second diode D2 is $-V_{BUS}$ (around −80V). This is shown in FIG. 3b. The voltage across the third diode D3 and the fourth diode D4 is the typical forward voltage of a conducting diode e.g. 0.75V. In this scenario, switches M5 and M6 of the multi-level half-bridge stage 110 are the switches that compose the half-bridge. These two switches enable the generation of a PWM voltage at the switching node V. The PWM voltage at the switching node $V_x$ is at $2*V_{BUS}$ when the lower half-bridge switch M6 is turned on (and the upper half-bridge switch M5 is turned off) and is at $3*V_{BUS}$ when M5 is turned on (M6 turned off). This PWM action enables to boost the input voltage from $2*V_{BUS} \leq V_{in} < 3*V_{BUS}$ to $3*V_{BUS}$ which is output on the segmented bus voltage output line $V_{L3}$, in accordance with conventional boost converter operation. Due to the switching of the capacitors in the flying ladder being connected between the terminals of the grounded ladder capacitors, as described above, the voltage between the terminals of all the grounded ladders capacitors is the same and equal to $V_{BUS}$.

Diode D3 will start conducting if the voltage in $V_x$ rises above $3*V_{BUS}$ (around 240V), clamping the node to $3V_{BUS}$. Since the source of switch M23 is connected to $2*V_{BUS}$ (around 160V) through switch M7 and diode D4, thus as shown in FIG. 3a, the voltage across the switch M23 will be $V_{BUS}$.

When $V_{in}$ is in the range, $240 \leq V_{in} < 320$—the switch M21 is turned on such that no current flows in the first diode D1, and switches M22-M24 are turned off (as shown in FIG. 3a) such that current flows in the second diode D2, third diode D3 and the fourth diode D4. The maximum blocking voltage across D1 is $-V_{BUS}$ (as shown in FIG. 3b). The voltage across the second diode D2, the third diode D3 and the fourth diode D4 is the typical forward voltage of a conducting diode e.g. 0.75V. In this scenario, M3 and M4 of the multi-level half-bridge stage 110 are the switches that compose the half-bridge. These two switches enable the generation of a PWM voltage at the switching node Vx. The PWM voltage at the switching node $V_x$ is at $3*V_{BUS}$ when the lower half-bridge switch M4 is turned on (and the upper half-bridge switch M3 is turned off) and is at $4*V_{BUS}$ when M3 is turned on (M4 turned off). This PWM action enables to boost the input voltage from $3*V_{BUS} \leq V_{in} < 4*V_{BUS}$ to $4*V_{BUS}$ which is output on the segmented bus voltage output line $V_{L4}$, in accordance with conventional boost converter operation. Due to the switching of the capacitors in the flying ladder being connected between the terminals of the grounded ladder capacitors, as described above, the voltage between the terminals of all the grounded ladders capacitors is the same and equal to $V_{BUS}$.

The source of switch M22 is connected to $3*V_{BUS}$ and if Vx rises above $4*V_{BUS}$ (around 320V) the diode D2 and the body diode of switch M3 will clamp the voltage at Vx to $4V_{BUS}$. Since the source of switch M22 is connected to $3*V_{BUS}$ through switch M5 and diode D3 the voltage across the switch M22 will be $V_{BUS}$.

When Vin is in the range, $4*V_{BUS} \leq V_{in} < 5*V_{BUS}$ the switches are as follows M21-M24 are turned off (as shown in FIG. 3a) such that current flows only in the first diode D1. The other diodes (second diode D2, third diode D3 and the fourth diode D4) only act as clamps so they do not conduct any current.

In this scenario M1 and M2 of the multi-level half-bridge stage 110 are the switches that compose the half-bridge. These two switches enable the generation of a PWM voltage at the switching node V. The PWM voltage at the switching node $V_x$ is at $4*V_{BUS}$ when the lower half-bridge switch M2 is turned on (and the upper half-bridge switch M1 is turned off) and is at $5*V_{BUS}$ when M1 is turned on (M2 turned off). This PWM action enables to boost the input voltage from $4*V_{BUS} \leq V_{in} < 5*V_{BUS}$ to $5*V_{BUS}$ which is output on the segmented bus voltage output line $V_{L5}$, in accordance with conventional boost converter operation. Due to the switching of the capacitors in the flying ladder being connected between the terminals of the grounded ladder capacitors, as described above, the voltage between the terminals of all the grounded ladders capacitors is the same and equal to $V_{BUS}$.

The source of switch M21 is connected to $4*V_{BUS}$ and if $V_x$ rises above $5*V_{BUS}$ (400V that is not probable since the input is connected to mains and the maximum peak voltage will be 330V) the diode D1 and the body diode of switch M1 will clamp the voltage at $V_x$ to $5*V_{BUS}$. Since the source of switch M21 is connected to $4*V_{BUS}$ through switch M3 and diode D2 the voltage across the switch M21 will be $V_{BUS}$.

In each of the scenarios described above, the voltage $V_{BUS}$ is present on the segmented bus voltage output line $V_{L1}$, the voltage $2*V_{BUS}$ is present on the segmented bus voltage output line $V_{L2}$, the voltage $3*V_{BUS}$ is present on the segmented bus voltage output line $V_{L3}$, the voltage $4*V_{BUS}$ is present on the segmented bus voltage output line $V_{L4}$, and the voltage $5*V_{BUS}$ is present on the segmented bus voltage output line $V_{L5}$. Thus it can be seen that the intermediate bus voltage ($5*V_{BUS}$) is balanced equally in the grounded capacitor ladder of the SCC stage 112. Depending on the input voltage the multiplexer connects the switching node $V_x$ to the corresponding switching node switching node $V_{x1}$-$V_{x5}$ provided by the half-bridges of the multi-level half-bridge stage 110, this is indicated in Table 1 below.

Table 1 further illustrates the switches that are operated in half-bridge mode whereby the lower switch of the half-bridge is denoted L-HB and the upper switch of the half-bridge is denoted U-HB.

Figure 11A:
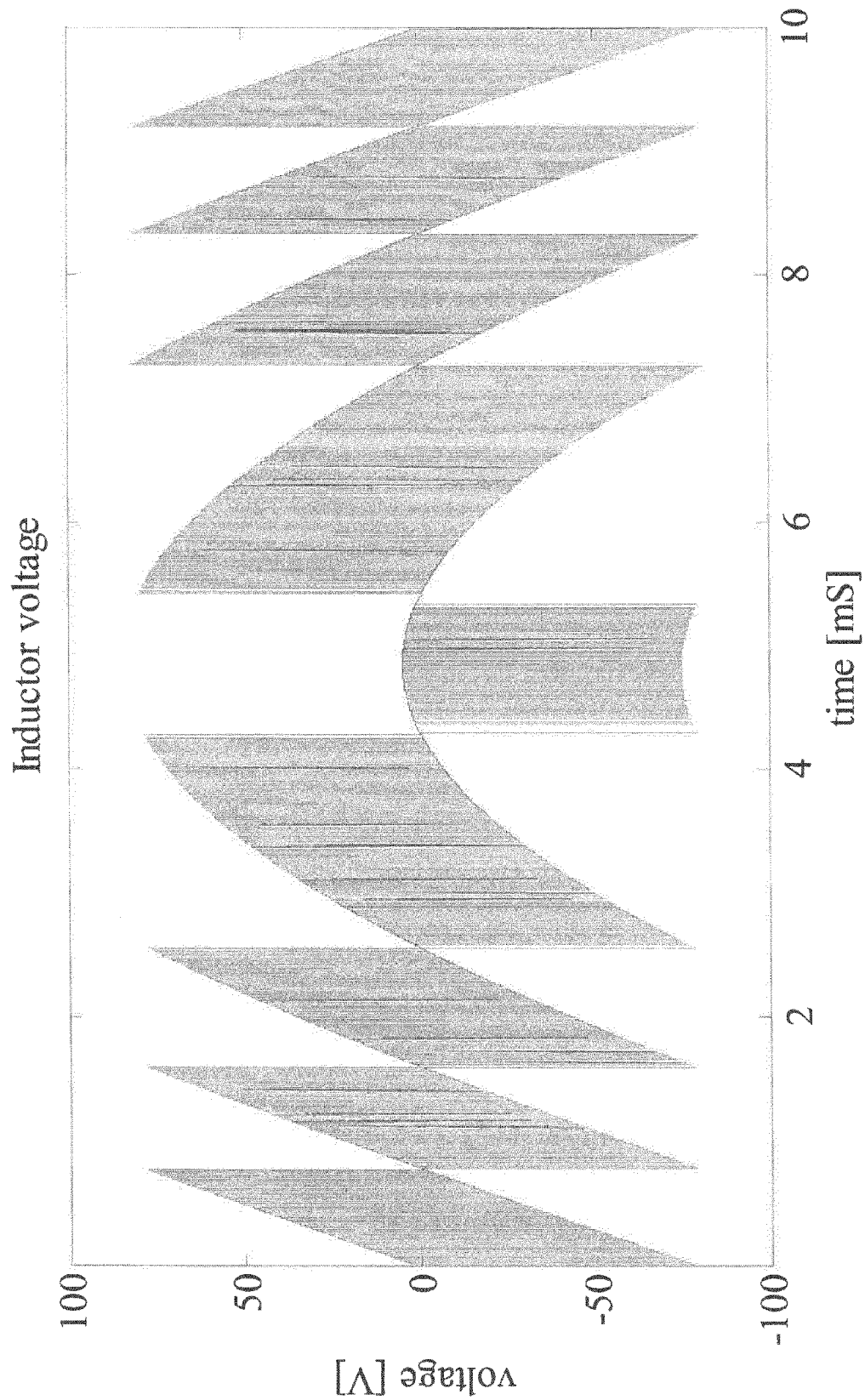
FIG. 11a illustrates an input inductor voltage waveform.

112V. FIG. 11c illustrates a portion of the input inductor 106 voltage waveform when the rectified mains voltage supplied from the rectifier 104 is 312V. As can be seen from FIGS. 11b-11c, in all scenarios the voltage ripple ($\Delta V_L$) in the input inductor 106 inductor is always the reduced $V_{BUS}$ (approximately 80V in the example presented above). This enables to reduce the inductance rating of the input inductor 106 by around 5 times compared to a state-of-the art boost PFC stage where the bus voltage is around 400V.

Figure 4:
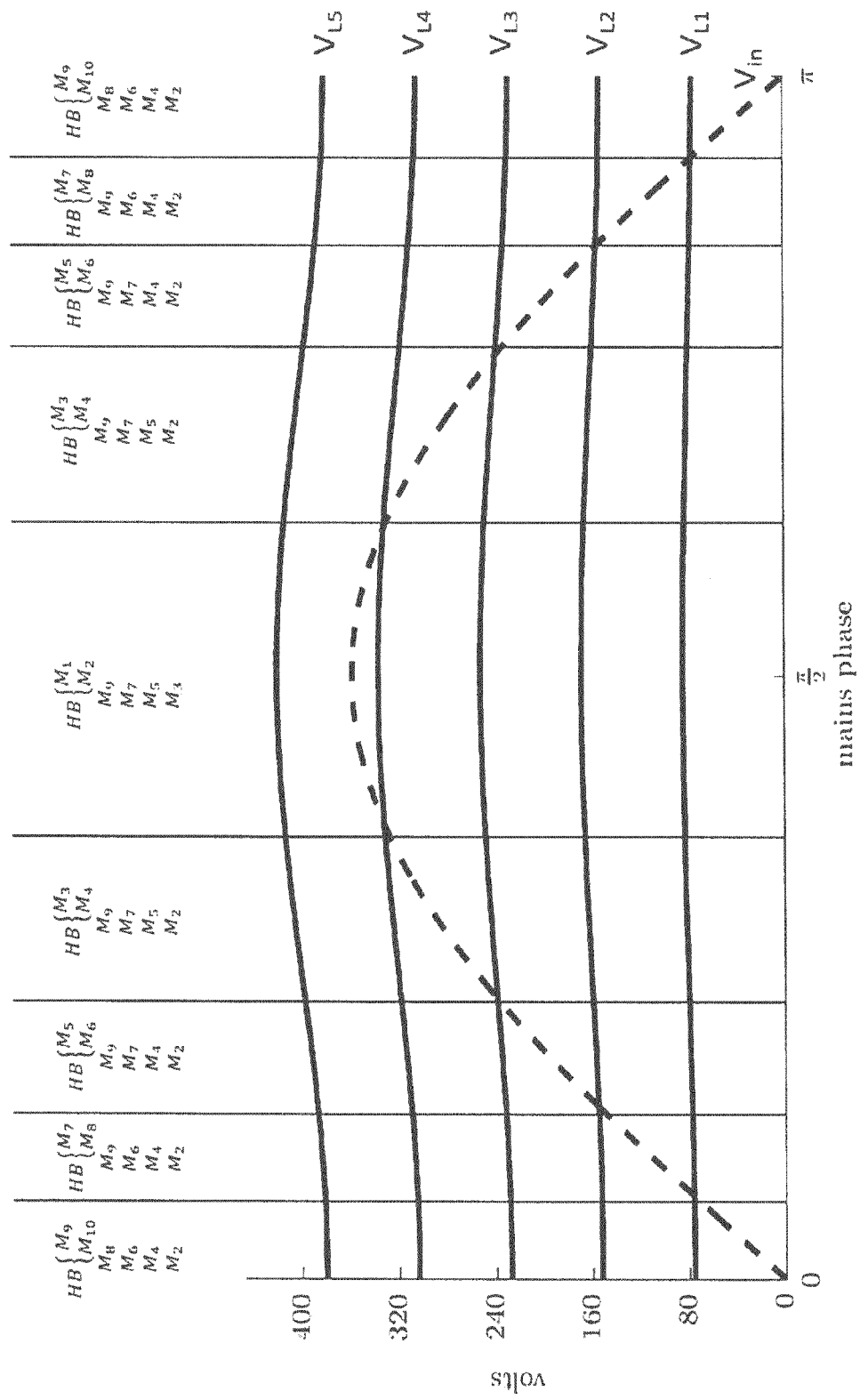
FIG. 4 illustrates switch activation of switches in a multi-level half-bridge stage of the power conversion system as a function of a mains voltage supplied from a mains supply voltage source during a half of the mains period for a peak voltage of 360V.

FIG. 4 illustrates the switch activation as a function of the mains voltage supplied from the mains supply voltage source 102 during a half of the mains period for a peak voltage of 360V. Thus FIG. 4 illustrates the contents of Table 1 in graphical form.

As shown in FIG. 4, the voltages at the segmented bus voltage output lines $V_{L1}$-$V_{L5}$ have an associated voltage ripple. This is due to variations in the mains input voltage supplied from the mains supply voltage source 102. Thus the voltages at the segmented bus voltage output lines $V_{L1}$-$V_{L5}$ are not a fixed absolute value. The average voltage on the segmented bus voltage output line $V_{L1}$ for a mains voltage cycle is $V_{BUS}$ (80V in the example presented above). The average voltage on the segmented bus voltage output line $V_{L2}$ for a mains voltage cycle is $2*V_{BUS}$ (160V in the example presented above). The average voltage on the segmented bus voltage output line $V_{L3}$ for a mains voltage cycle is $3*V_{BUS}$ (240V in the example presented above). The average voltage on the segmented bus voltage output line $V_{L4}$ for a mains voltage cycle is $4*V_{BUS}$ (320V in the example presented above). The average voltage on the segmented bus voltage output line $V_{L4}$ for a mains voltage cycle is $4*V_{BUS}$ (400V in the example presented above).

Figure 5B:
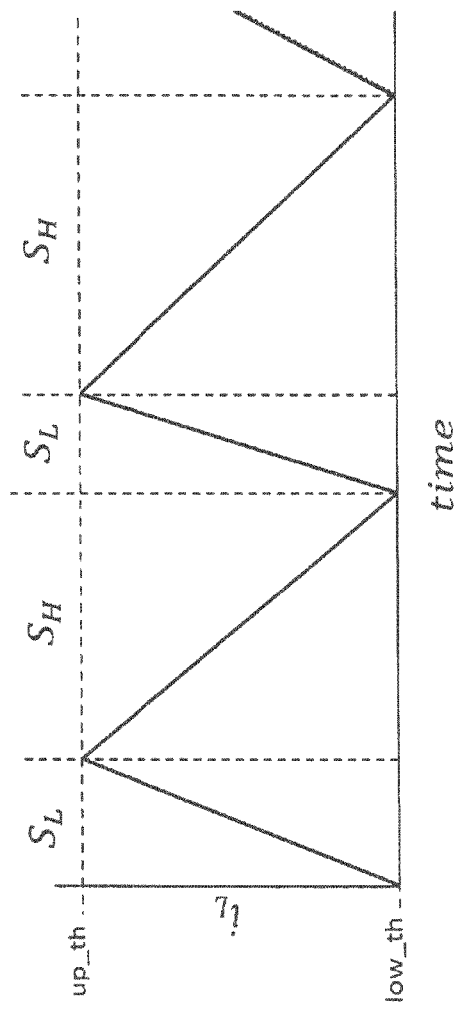
FIG. 5b illustrates a current waveform of an input inductor of the power conversion system according to an exemplary embodiment of the present invention.
Figure 5A:
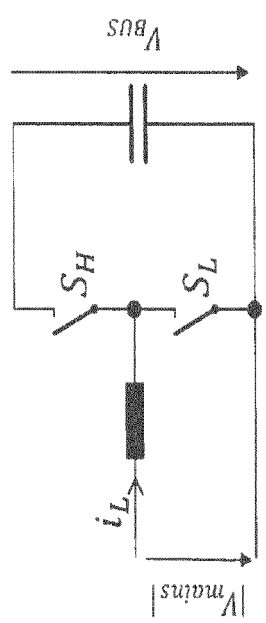
FIG. 5a illustrates a simplified schematic of a boost half-bridge stage of the multi-level half-bridge stage of the power conversion system.

FIG. 5a illustrates a simplified schematic of a boost half-bridge stage of the multi-level half-bridge stage 110. The switching operation of the switches of the half-bridge

TABLE 1

| Input voltage [V] | $V_X$ | M1 | M2 | M3 | M4 | M5 | M6 | M7 | M8 | M9 | M10 |
|---|---|---|---|---|---|---|---|---|---|---|---|
| $0 \leq V_{in} < V_{BUS}$ | $V_{X1}$ | OFF | ON | OFF | ON | OFF | ON | OFF | ON | U-HB | L-HB |
| $V_{BUS} \leq V_{in} < 2 V_{BUS}$ | $V_{X2}$ | OFF | ON | OFF | ON | OFF | ON | U-HB | L-HB | ON | OFF |
| $2 V_{BUS} \leq V_{in} < 3 V_{BUS}$ | $V_{X3}$ | OFF | ON | OFF | ON | U-HB | L-HB | ON | OFF | ON | OFF |
| $3 V_{BUS} \leq V_{in} < 4 V_{BUS}$ | $V_{X4}$ | OFF | ON | U-HB | L-HB | ON | OFF | ON | OFF | ON | OFF |
| $4 V_{BUS} \leq V_{in} < 5 V_{BUS}$ | $V_{X5}$ | U-HB | L-HB | ON | OFF | ON | OFF | ON | OFF | ON | OFF |

In each of the above scenarios outlined above (whereby the input voltage is in one of a plurality of voltage ranges), the voltage drop $V_L$ in the input inductor 106 (which can be expressed $V_{in}$-$V_x$) is positive when the lower half-bridge switch is on and negative when the higher half-bridge switch is on. It can be seen that the voltage across the input inductor 106 has a positive minimum voltage when higher half-bridge switch is on ($V_L=-V_{BUS}$), and a positive maximum voltage when the lower half-bridge switch is on ($V_L=V_{BUS}$). This is shown in FIG. 11a which illustrates the input inductor 106 voltage waveform during half of the period of the rectified mains voltage supplied from the rectifier 104. It will be appreciated that the input inductor 106 voltage waveform in each half period of the rectified mains voltage supplied from the rectifier 104 takes the form shown in FIG. 11a.

Figure 11B:
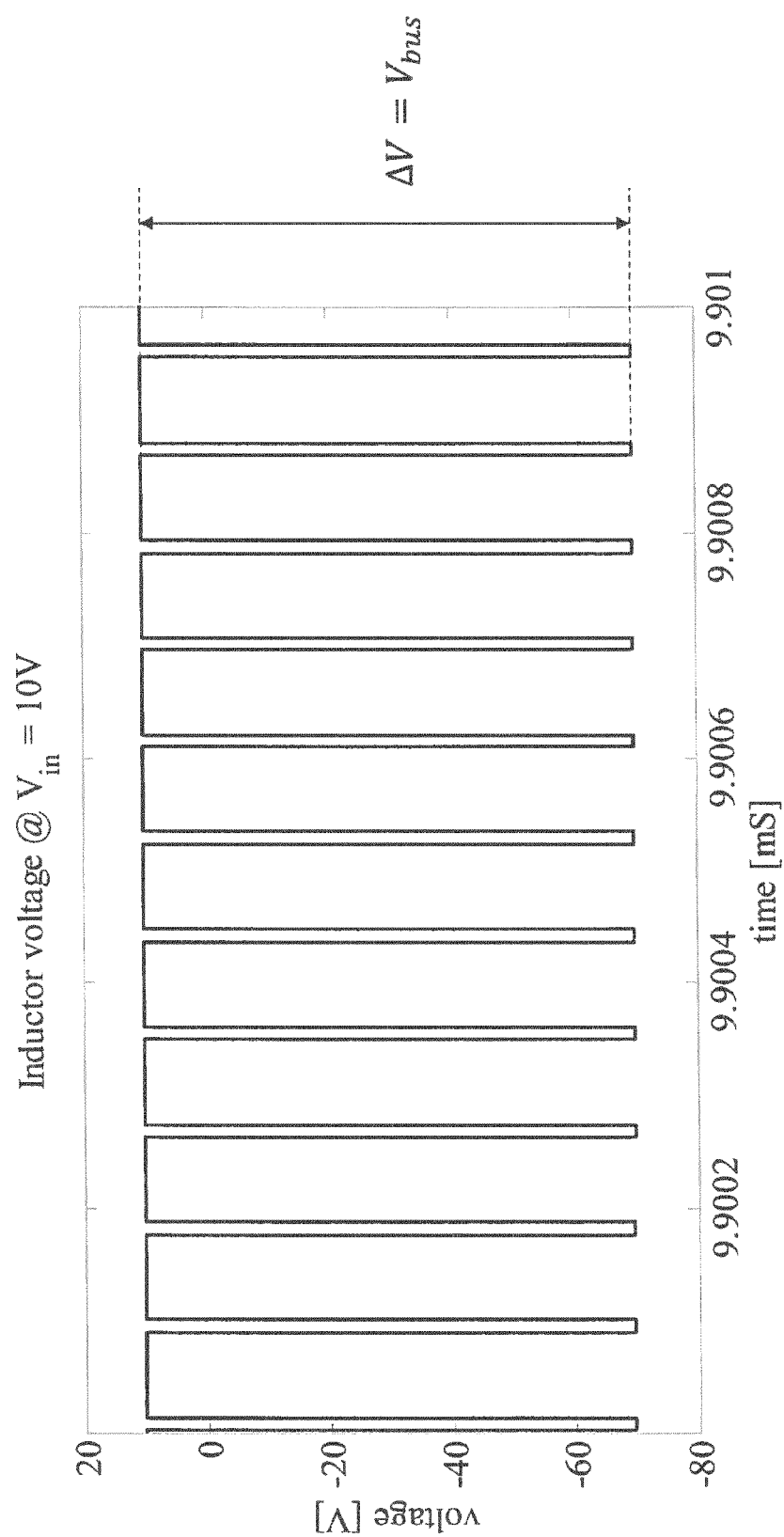
FIGS. 11b-d illustrate portions of the input inductor voltage waveform.
Figure 11C:
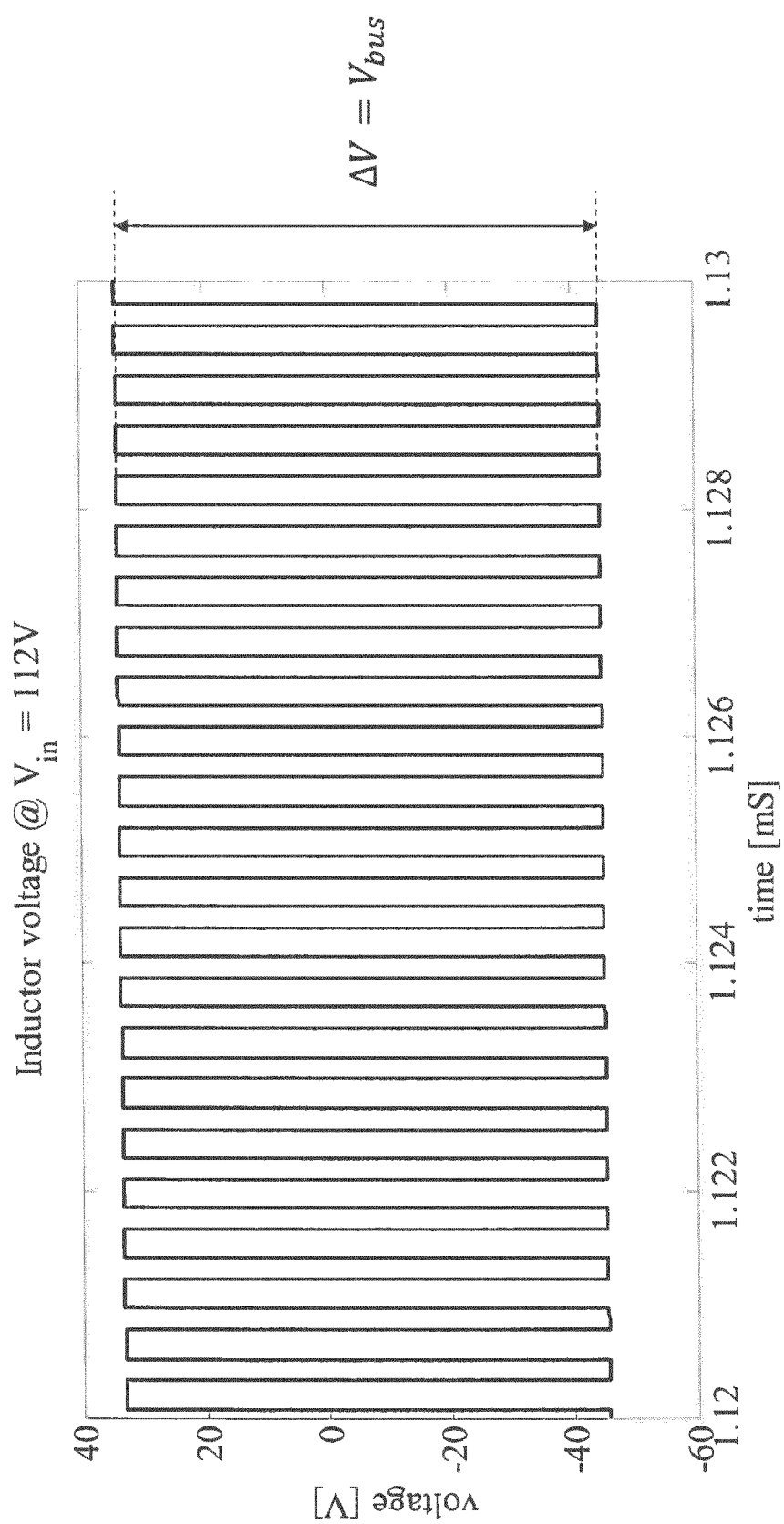
Figure 11D:
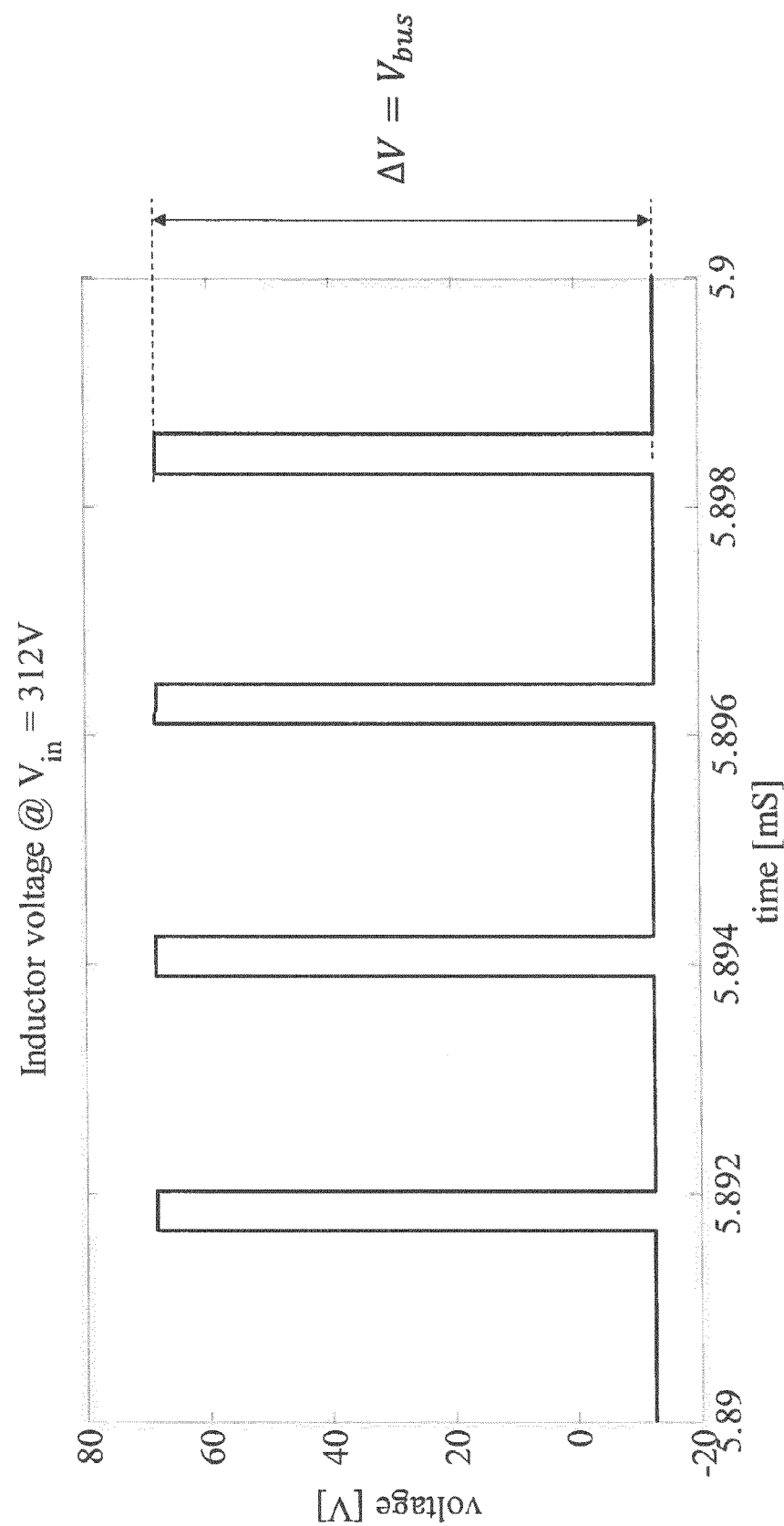

FIG. 11b illustrates a portion of the input inductor 106 voltage waveform when the rectified mains voltage supplied from the rectifier 104 is 10V. FIG. 11c illustrates a portion of the input inductor 106 voltage waveform when the rectified mains voltage supplied from the rectifier 104 is stage is determined by the input current waveform in the input inductor 106. Among the different possibilities, the controller 118 may control the segmented PFC boost converter stage 105 to operate in the Critical Conduction Mode (CrCM), imposing the characteristic triangular waveform of the current in the input inductor 106 to transit from zero to a peak current (when the lower half-bridge switch is turned on) and back to zero (when the upper half-bridge switch is turned on) during a switching cycle, as shown in FIG. 5b. It will be apparent to persons skilled in the art that embodiments of the present invention extend to other modes of operation of the segmented PFC boost converter stage 105, for example, to operate in the Continuous Conduction Mode (CCM) or Discontinuous Conduction Mode (DCM).

Figure 6:
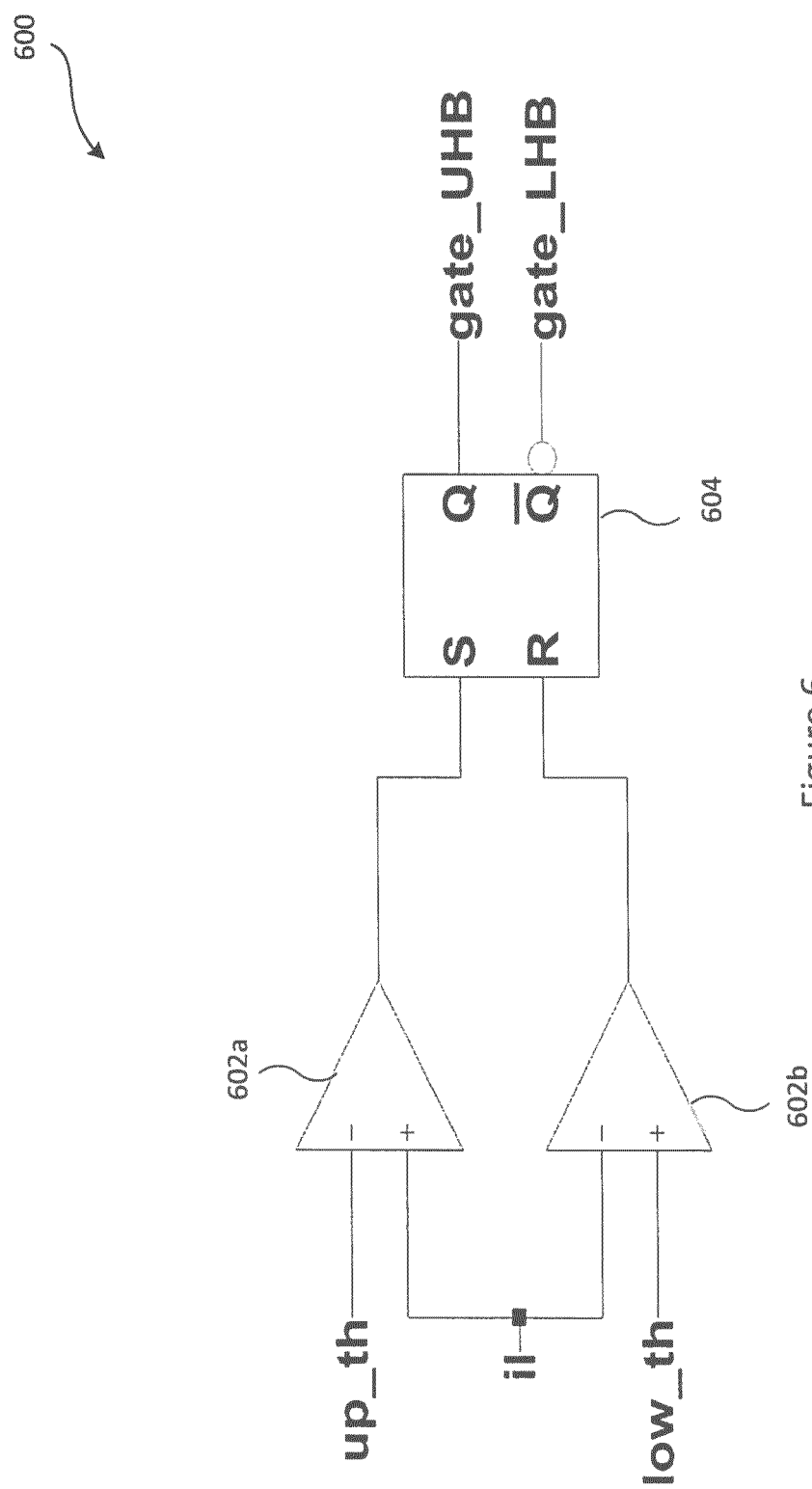

The controller 118 comprises a hysteretic controller stage 600 in order to realize the CCM. As shown in FIG. 6, the hysteretic controller stage 600 comprises a comparator 602a that compares the current il in the input inductor 106 to an upper current threshold up_th (shown in FIG. 5b), and a comparator 602b that compares the inductor current il to an lower current threshold low_th (shown in FIG. 5b).

Figure 12:
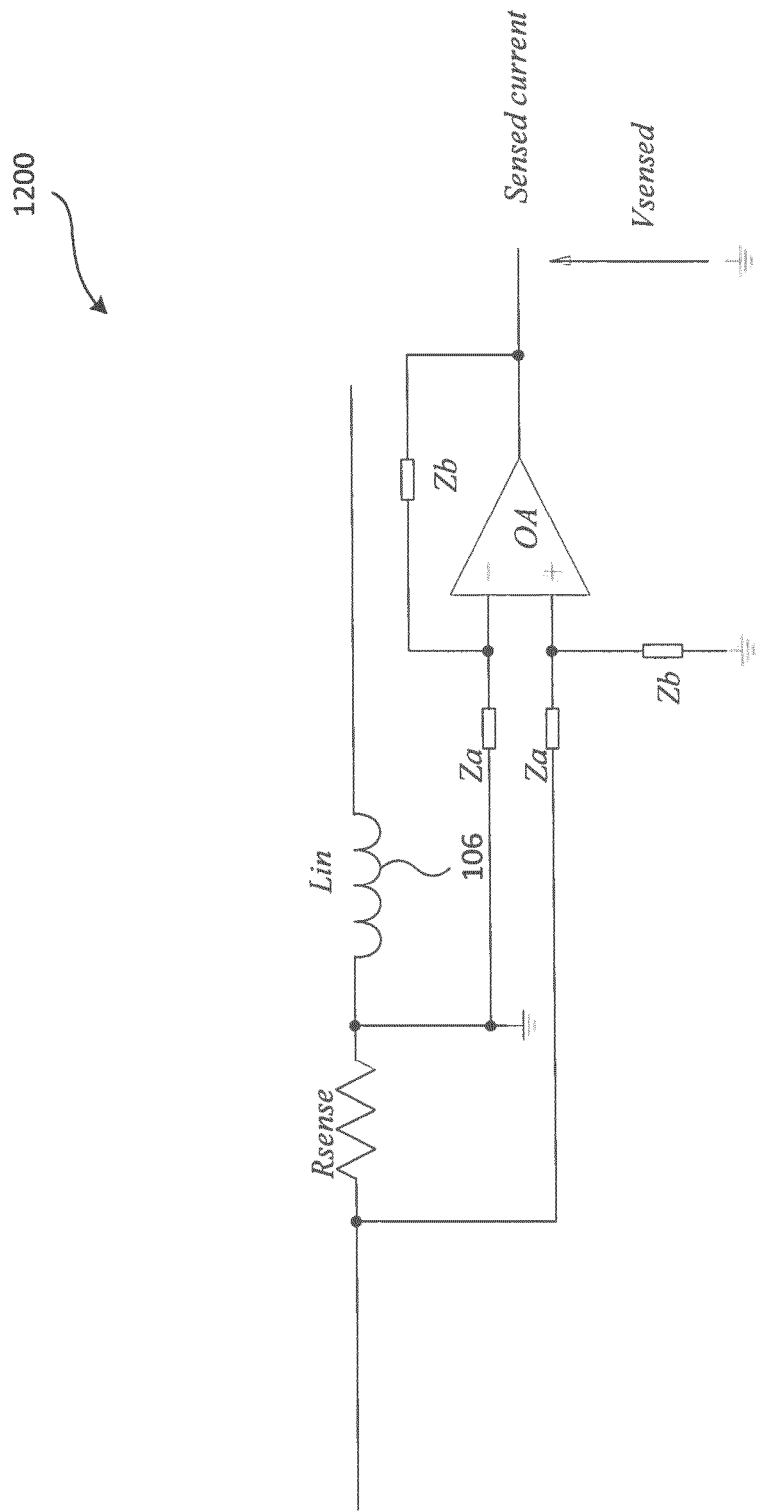
FIG. 12 illustrates an inductor current sensing circuit.

An inductor current sensing circuit is used to sense the current il in the input inductor 106 and provide an output that is indicative of the current il to the hysteretic controller stage 600. Current sensing circuits are well known to persons skilled in the art, and embodiments of the present disclosure are not limited to a particular current sensing circuit. An example inductor current sensing circuit 1200 is shown in FIG. 12 that comprises a resistor, $R_{sense}$, which is connected in series between the rectifier 104 and the input inductor 106, and a differential operational amplifier circuit that is arranged to output a voltage that is indicative of the difference between the voltages at the terminals of the resistor, $R_{sense}$.

The output of the comparators 602a and 602b are supplied to an S-R latch 604. In particular, the output of the comparator 602a is supplied to the S input of the S-R latch 604 and the output of the comparator 602b is supplied to the R input of the S-R latch 604.

The Q output of the S-R latch 604 is provided as a gate signal (gate_UHB) to the upper switch of the active half-bridge stage of the multi-level half-bridge stage 110. The NOT Q output of the S-R latch 604 is provided as a gate signal (gate_LHB) to the lower switch of the active half-bridge stage of the multi-level half-bridge stage 110. For a CrCM operation the lower current threshold low_th is typically set to zero. The hysteretic controller stage 600 can be enhanced including a dead-time generator between the upper and lower gate signals that with proper timing can enable soft-switching operation. The comparators 602a and 602b can include a hysteresis to prevent instabilities.

The hysteretic controller stage 600 may be coupled to each of the half-bridge stages of the multi-level half-bridge stage 110 via a selection means (e.g. a demultiplexer). The selection means receives as inputs the gate signal (gate_LHB) and the gate signal (gate_UHB) and has outputs connected to the gate terminals of each of the switches M1-M10 (the half-bridge stages of the multi-level half-bridge stage 110). In dependence on the input rectified mains voltage this selection means is configured to determine which of the half-bridge stages is to be active and supply the gate signal (gate_LHB) to the lower switch of the active half-bridge stage and supply the gate signal (gate_UHB) to the upper switch of the active half-bridge stage.

The low frequency (LF) waveform shape of the input current during half period of the mains cycle can be controlled by the value set in the upper current threshold up_th. Depending on the input current shaping the SCC stage 112 can be optimized for power quality or mains storage (minimizing the size of the mains storage capacitor $C_{BUS}$).

Figure 7A:
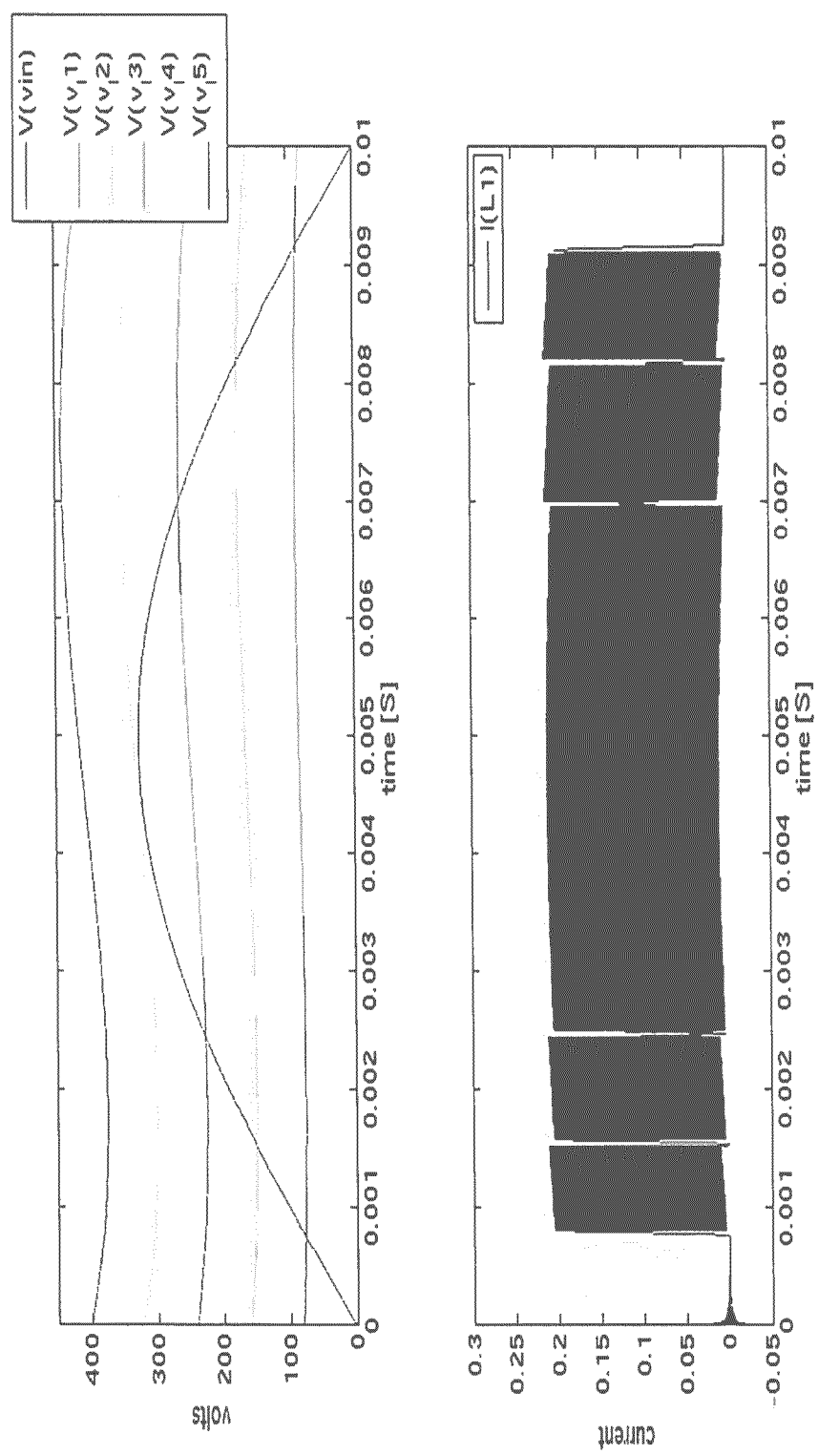
FIGS. 7a and 7b show a plot of segmented bus voltages and a plot of input current of a segmented PFC boost converter stage of the power conversion system.

FIG. 7a shows the waveform of a segmented PFC boost converter stage 105 providing four levels of conversion whereby Lin=200 uH and $C_{BUS}$=50 µF. In this implementation, switches M24, M9, and M10, and diode D4 of the segmented PFC boost converter stage 105 shown in FIG. 2 would be removed.

Figure 7B:
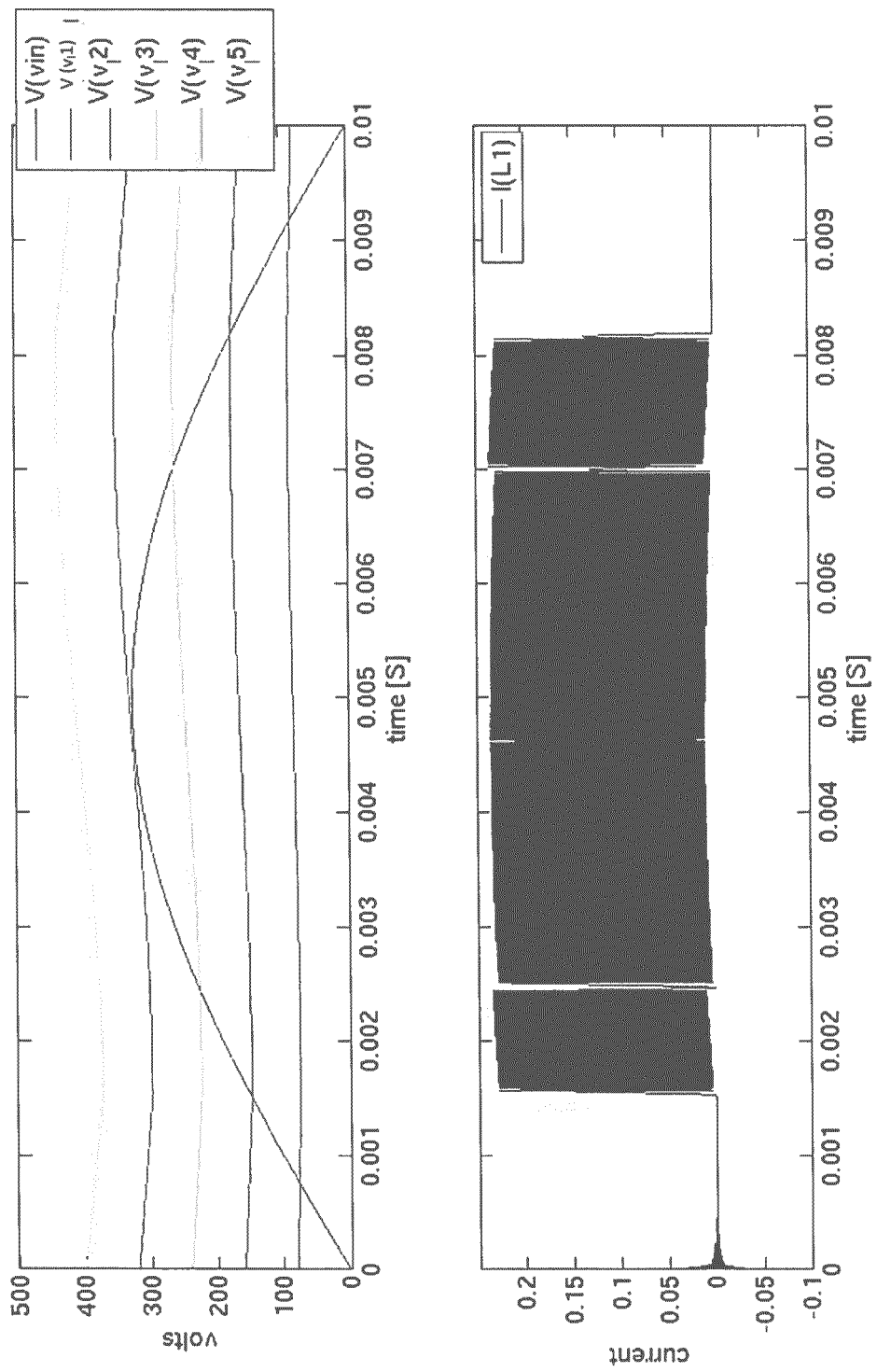

FIG. 7b shows the waveform of a segmented PFC boost converter stage 105 providing three levels of conversion whereby Lin=200 uH and $C_{BUS}$=70 µF. In this implementation, switches M23, M24, M7, M8, M9, and M10, and diodes D3 and D4 of the segmented PFC boost converter stage 105 shown in FIG. 2 would be removed.

FIGS. 7a and 7b shows the waveform of the segmented PFC boost converter stage 105 during half of a mains period for $V_{mains}$=230 Vrms. In FIGS. 7a and 7b the top plot shows the input voltage and the segmented bus voltages $V_{L1}$-$V_{L5}$, and on the bottom plot is the input current. It will be appreciated that the current waveforms appear as solid blocks due to the rapid charging and discharging of the inductor current in the input inductor 106 which has a triangular waveform shown more clearly in FIG. 5b.

It can be seen in that in these two cases the input current is not drawn during the entire mains cycle, which on the one hand reduces the necessary number of components in the segmented PFC boost converter stage 105, however on the other hand increases the size of the mains storage capacitor $C_{BUS}$. The voltage $V_{BUS}$ is always the same, but in the embodiments of FIGS. 7a and 7b, energy is withdrawn during less time, thus energy is needed to be supplied during a longer period of time (during the time that the input voltage is below the first segmented bus voltages $V_{L1}$ or the second segmented bus voltages $V_{L2}$). Thus more storage in the mains storage capacitor $C_{BUS}$ is needed. In FIG. 7a it can be seen that the input current starts to flow when the input voltage is above the first segmented bus voltage $V_{L1}$, around 80V ($V_{BUS}$). In FIG. 7b it can be seen that the input current starts to flow when the input voltage is above the second segmented bus voltage $V_{L2}$, around 160V ($2 \ast V_{BUS}$).

Besides the evident reduction of the voltage stress in the switches in the SCC stage 112, the proposed invention also achieves a reduction of the switching frequency of the SCC stage 112 compared to the classical boost PFC approach.

Figure 8:
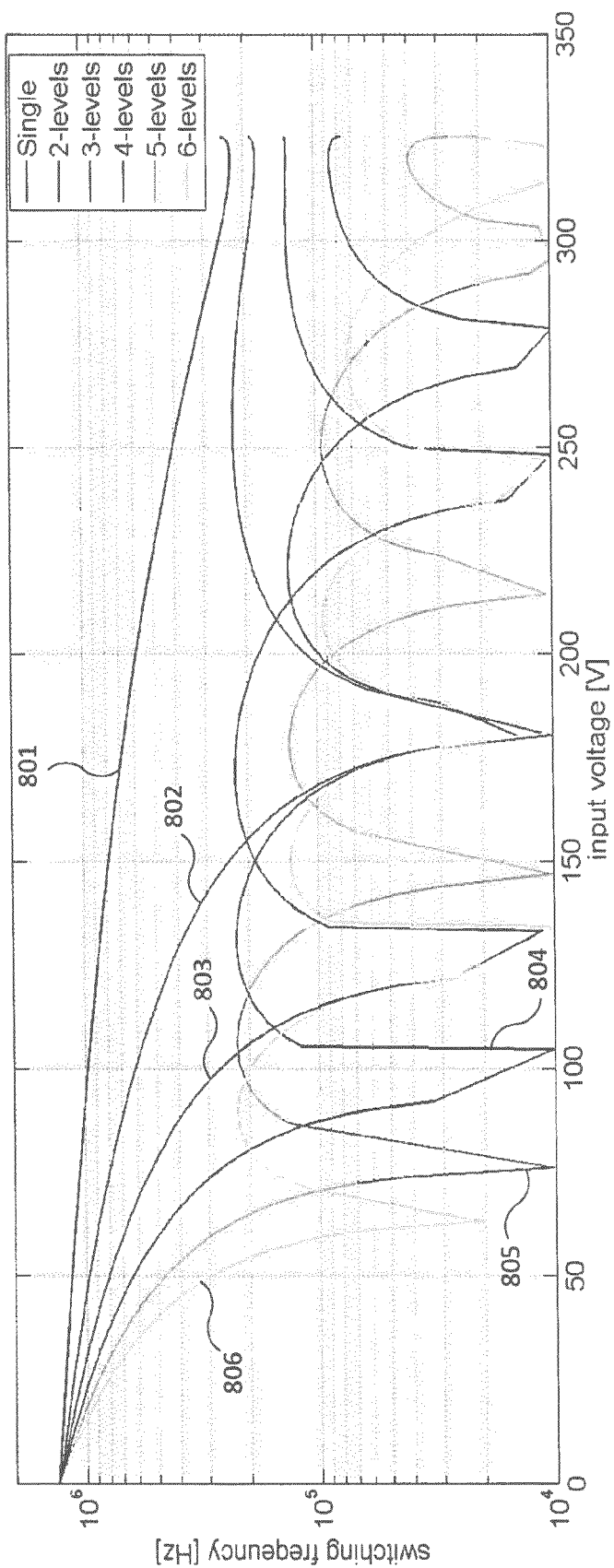
FIG. 8 illustrates the switching frequency of switches in a voltage converter stage of the power conversion system as a function of mains voltage in dependence on the number of segmented voltage levels provided in the voltage converter stage.

FIG. 8 illustrates the switching frequency of switches in the SCC stage 112 as a function of the mains voltage supplied by the mains supply voltage source 102. Curves 801-806 are parameterized for the number of segmented voltage levels in the SCC stage 112. Curve 801 represents the switching frequency for the segmented PFC boost converter stage 105. Curve 802 represents the switching frequency for the SCC stage 112 operating as a 2:1 voltage divider (i.e. having two levels). Curve 803 represents the switching frequency for the SCC stage 112 operating as a 3:1 voltage divider (i.e. having three levels). Curve 804 represents the switching frequency for the SCC stage 112 operating as a 4:1 voltage divider (i.e. having four levels). Curve 805 represents the switching frequency for the SCC stage 112 operating as a 5:1 voltage divider (i.e. having five levels). Curve 806 represents the switching frequency for the SCC stage 112 operating as a 6:1 voltage divider (i.e. having six levels).

Figure 9:
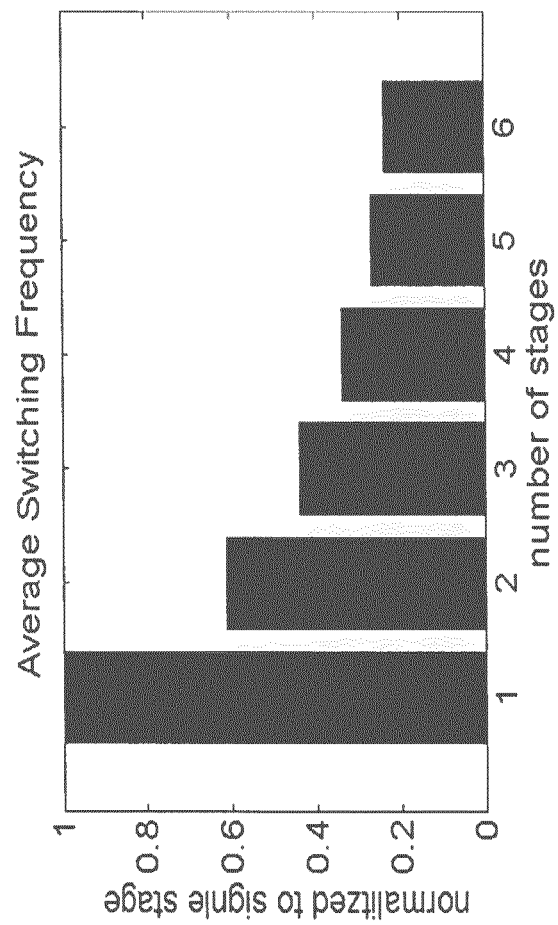
FIG. 9 illustrates the average switching frequency of switches in voltage converter stage normalized with respect to the segmented PFC boost converter stage.

FIG. 9 illustrates the average switching frequency of switches in the SCC stage 112 normalized with respect to the segmented PFC boost converter stage 105.

From FIGS. 8 and 9 it can be seen that the switching frequency of the SCC stage 112 is reduced as the number of levels is increased, achieving a reduction up to 70% for a 5 level architecture. From FIG. 8 it can be seen that the switching frequency decreases as the input voltage increases, therefore the SCC stage 112 efficiency can be improved when the SCC stage 112 is not withdrawing current for low input voltages; as can be seen in the simulations of FIGS. 7a and 7b.

Figure 10:
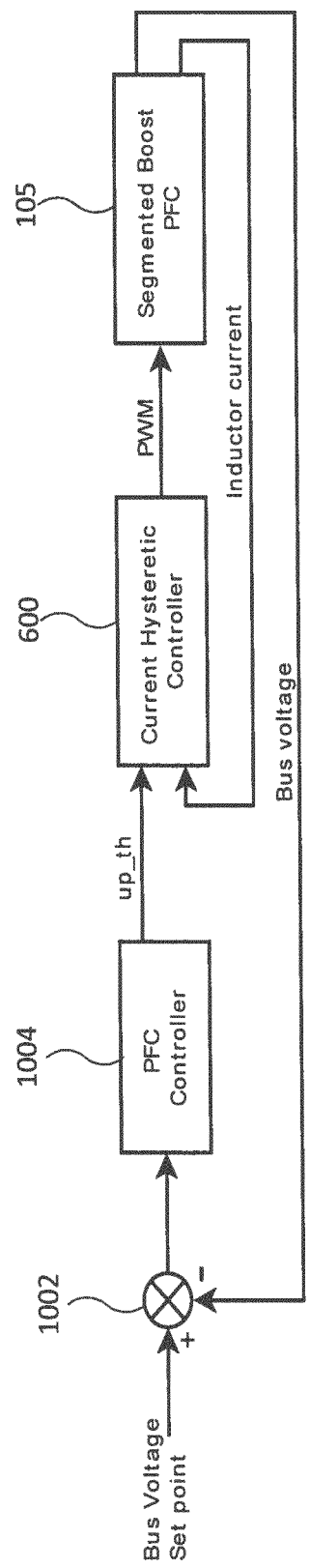
FIG. 10 illustrates a closed loop control scheme implemented by a controller of the power conversion system.

A close loop control scheme as shown in FIG. 10 is implemented by the controller 118 in order to guarantee a stable voltage in the mains storage capacitor $C_{BUS}$. The bus voltage ($V_{BUS}$) is sensed and compared with a bus voltage set point by a comparator 1002. The comparator 1002 outputs an error signal which is the difference between the bus voltage set point and the sensed bus voltage ($V_{BUS}$). The comparator 1002 supplies the error signal to a PFC controller 1004.

The PFC controller 1004 is configured to output a signal indicative of the upper current threshold, up_th, to the hysteretic controller stage 600, based on the error signal received from the comparator 1002. In order to provide the bus voltage set point on the segmented bus voltage output line $V_{L1}$, the PFC controller 1004 adjusts the amount of input current by varying the upper current threshold, up_th, to minimise the error signal. When the sensed bus voltage ($V_{BUS}$) is less than the bus voltage set point, the PFC controller 1004 increases the upper current threshold, up_th, to increase the input current. When the sensed bus voltage ($V_{BUS}$) is greater than the bus voltage set point, the PFC controller 1004 decreases the upper current threshold, up_th, to decrease the input current.

The hysteretic controller stage 600 also receives as an input a signal indicative of the sensed inductor current il through the inductor $L_{in}$ of the segmented PFC boost converter stage 105. As described above with reference to FIG. 6, the hysteretic controller stage 600 compares the inductor current il to the upper current threshold up_th and to the lower current threshold low_th in order to generate PWM gate signals gate_LHB and gate_UHB that are supplied to the active half-bridge stage of the multi-level half-bridge stage 110. By sensing the bus voltage ($V_{BUS}$) the average input current can be adjusted in order to maintain the voltage fixed by the bus voltage set point, in this way the SCC stage 112 withdraws the necessary amount of energy to supply the load 114 and the losses in the SCC stage 112.

Referring back to FIG. 2, the output of the SCC stage 112 is supplied to a load 114. Whilst FIG. 2 illustrates a resistive load, the SCC stage 112 may be used to deliver a stepped-down voltage to any type of load. For example the load could be a lighting load such as a single LED or a set of LEDs, for example a string of LEDs. Whilst an LED light source is referred to herein, any suitable light source may be driven by the SCC stage 112 e.g. a high/low pressure gas discharge source, a laser diode, an incandescent source, or a halogen source. Embodiments are not limited to lighting applications i.e. driving lighting loads, but also other applications, wherein size constraints similarly apply (e.g. in devices such as smart phones, laptop PCs and other portable devices, which need slim and compact electronic design).

It will be appreciated that an output filter may be connected between the output of the SCC stage 112 and the load 114. The output filter may be formed using one or any combination of: at least one resistor, at least one inductor and at least one capacitor.

In accordance with embodiments of the present invention the intermediate bus voltage between the segmented PFC boost converter stage 105 and the SCC stage 112 is divided in levels within the SCC stage 112 which enables (i) power train implementation with low voltage (LV) switches, suitable in the state-of-the-art Very-large-scale integration (VLSI) processes, (ii) reduced magnetics due to higher frequency operation (as shown in FIG. 8 and FIG. 9) and lower voltage ripples, (iii) further flexibility in the design by scaling the number of voltage levels, thus tuning the voltage levels (see the levels in FIG. 4 and FIG. 7), (iv) reduced voltage in the mains storage capacitor $C_{BUS}$, and (iv) a high level integration AC/DC converter.

Embodiments of the present disclosure are not limited to the power combining stage 112 comprising a switched capacitor converter (SCC). That is, the power combining stage 112 may comprise any circuitry that includes a plurality of parallel input nodes and is operable to (i) combine the power supplied to the plurality of input nodes to supply a DC output voltage to the load 114, and (ii) is operable to provide a voltage between each of the plurality of input nodes, wherein the sum of the voltages across each of the plurality of input nodes is higher than the peak of the rectified mains voltage supplied from the rectifier 104.

All the switches of the SCC stage 112 can be bi-directional and implemented in a suitable technology that is compatible with the switching frequency of the circuit. For instance the switches can be formed by Metal Oxide Semiconductor Field Effect Transistors (MOSFET) on a silicon substrate or High Electron Mobility Transistors (HEMT) on a Gallium-Nitride substrate.

The capacitors can also be implemented using a technology similar to that applied to Ferroelectric Random Access Memory (FRAM) or embedded Dynamic Random Access Memory (eDRAM). The higher dielectric constant achieved with such technologies makes the integrated SCCs smaller and thus cheaper.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

It is to be noticed that though mostly applications wherein the load is a light source are described herein, the current invention can also apply to many systems wherein there is a need for integrated power management units, for example in integrated devices such as implantable or wearable body sensors for sensing physical or physiological parameters, or in integrated energy harvesting units, etc.

The invention claimed is:

1. A power conversion system for supplying a load, the power conversion system comprising:
    a power factor corrective front end comprising: an input inductor configured to receive a rectified mains input voltage, a selection module connected to the input inductor via a switching node ($V_x$), and a multi-level half-bridge stage comprising a plurality of half-bridge stages connected in series, each half-bridge stage comprising a pair of switches connected at a floating switching node ($V_{x1}$, $V_{x2}$, $V_{x3}$, $V_{x4}$, $V_{x5}$), whereby each half-bridge floating switching node is connected to one of a plurality of outputs of the selection module;
    a power combining stage coupled to each half-bridge stage of the power factor corrective front end by way of one of a plurality of parallel bus voltage lines ($V_{L1}$, $V_{L2}$, $V_{L3}$, $V_{L4}$, $V_{L5}$) output from said multi-level half-bridge stage, the power combining stage configured to combine power on the plurality of parallel bus voltage lines to output a DC voltage to said load; and
    a controller configured, in dependence on the rectified mains input voltage, to selectively control one of said half-bridge stages to operate in a half-bridge mode, and control the selection module to connect the switching node with the floating switching node of the selected half-bridge stage to provide a stepped-up voltage on one of the plurality of parallel bus voltage lines,
    wherein the controller is further configured to control the power combining stage to provide a voltage ($V_{BUS}$) between each of the plurality of parallel bus voltage lines, wherein the sum ($5*V_{BUS}$) of the voltages across each of the plurality of parallel bus voltage lines is higher than a peak of the rectified mains input voltage.

2. The power conversion system of claim 1, wherein the selection module comprises a plurality of switches and a plurality of voltage clamping components, each voltage clamping component configured to operate as a voltage clamp to limit a maximum blocking voltage of one of the switches to said voltage.

3. The power conversion system of claim 1, wherein the controller comprises an inductor current sensing circuit configured to sense current in the input inductor; and is configured to generate pulse width modulated signals for driving an upper switch of the half-bridge stage and lower switch of the half-bridge stage operating in the half-bridge mode, based on the sensed current in the input inductor.

4. The power conversion system of claim 3, wherein the controller comprises a current controller stage comprising a first comparator configured to compare the sensed current in the input inductor to an upper threshold and a second comparator configured to compare the sensed current in the input inductor to a lower threshold, wherein outputs of the first comparator and the second comparator are used to generate the pulse width modulated signals for driving an upper switch of the half-bridge stage and lower switch of the half-bridge stage operating in the half-bridge mode.

5. The power conversion system of claim 4, wherein the current controller stage comprises an S-R latch, wherein the output of the first comparator is supplied to a first input of the S-R latch and the output of the second comparator is supplied to a second input of the S-R latch, and a first output of the S-R latch outputs a pulse width modulated signal for driving the upper switch of the half-bridge stage and a second output of the S-R latch outputs a pulse width modulated signal for driving the lower switch of the half-bridge stage.

6. The power conversion system of claim 4, wherein the controller further comprises:
a comparator stage configured to compare said voltage to a voltage set point to output an error signal; and
a power factor controller stage configured to receive the error signal as an input, and adjust the upper threshold based on the error signal.

7. The power conversion system of claim 6, wherein the error signal indicates said voltage is less than the voltage set point, the power factor controller stage is configured increase the upper threshold; and wherein the error signal indicates said voltage is greater than the voltage set point, the power factor controller stage is configured decrease the upper threshold.

8. The power conversion system of claim 3, wherein the controller controls the half-bridge stage to operate in the half-bridge mode in accordance with a critical conduction mode.

9. The power conversion system of claim 8, wherein the lower threshold is set to zero.

10. The power conversion system of claim 1, wherein the power combining stage comprises a Switched Capacitor Converter, comprising a plurality of switches controlled by the controller.

11. The power conversion system of claim 10, wherein the Switched Capacitor Converter is based on a Dickson ladder topology comprising a first set of switches and a second set of switches, wherein the controller is configured to drive the first set of switches and the seconds set of switches in a complementary manner.

12. The power conversion system of claim 10, wherein the Switched Capacitor Converter comprises a grounded capacitor ladder comprising a plurality of capacitors, and a flying capacitor ladder comprising at least one capacitor.

13. The power conversion system of claim 12, wherein the controller is configured to drive the first set of switches and the seconds set of switches to control the capacitors in the flying capacitor ladder to switch between terminals of the grounded capacitor ladder to provide said voltage between each of the plurality of parallel bus voltage lines.

14. The power conversion system of claim 9, wherein the Switched Capacitor Converter has a fixed step-down conversion ratio.

15. The power conversion system of claim 1, wherein said load is a light module comprising at least one light source.

* * * * *